US012662201B2

(12) United States Patent
Jones

(10) Patent No.: US 12,662,201 B2
(45) Date of Patent: Jun. 23, 2026

(54) MODULAR SYSTEM AND METHOD FOR PRODUCING MOBILE WORKSTATIONS

(71) Applicant: AVAN Mobility Inc., Winnipeg (CA)

(72) Inventor: Bryn Jones, Stonewall (CA)

(73) Assignee: Avan Mobility Inc., Winnipeg (CA)

( * ) Notice: Subject to any disclaimer, the term of this patent is extended or adjusted under 35 U.S.C. 154(b) by 353 days.

(21) Appl. No.: 18/501,088

(22) Filed: Nov. 3, 2023

(65) Prior Publication Data

US 2024/0174303 A1 May 30, 2024

Related U.S. Application Data

(60) Provisional application No. 63/422,630, filed on Nov. 4, 2022.

(51) Int. Cl.
| | |
|---|---|
| *B62D 33/04* | (2006.01) |
| *B60P 3/14* | (2006.01) |
| *B60P 3/38* | (2006.01) |
| *B62D 33/06* | (2006.01) |

(52) U.S. Cl.
CPC .............. B62D 33/046 (2013.01); B60P 3/14 (2013.01); B60P 3/38 (2013.01); B62D 33/042 (2013.01); B62D 33/0612 (2013.01)

(58) Field of Classification Search
CPC ................ B60R 13/01; B60R 13/0275; B60R 2013/0281; B60R 2013/0293; B60R 2013/015; B60R 2013/018; B60P 3/14; B60P 3/34; B60P 3/36; B60P 3/38; B62D 33/04; B62D 33/046; B62D 33/0612

USPC .... 296/26.08–26.11, 165, 170–173, 175, 64, 296/164, 193.04, 24.3, 24.4, 24.42, 24.32, 296/24.43, 24.38, 24.39, 1
See application file for complete search history.

(56) References Cited

U.S. PATENT DOCUMENTS

| | | | | | |
|---|---|---|---|---|---|
| 2,665,165 | A | * | 1/1954 | Pitman ..................... | B60N 2/24 296/64 |
| 3,888,539 | A | * | 6/1975 | Niessner ................... | B60P 3/34 296/156 |
| 4,139,229 | A | * | 2/1979 | Cooper .................. | B62D 33/08 296/26.1 |
| 4,163,577 | A | * | 8/1979 | Vanderslice .............. | B60P 3/36 296/175 |
| 4,458,864 | A | * | 7/1984 | Colombo ............... | A61G 3/001 244/120 |

(Continued)

*Primary Examiner* — Gregory A Blankenship

(74) *Attorney, Agent, or Firm* — The Dobrusin Law Firm, P.C.

(57) ABSTRACT

A system for use with a van having: a front seat; and a cargo area including a floor and an aisle extending rearwardly from the seat and flanked by support portions. The system comprises: panels which in use define a room having: a terminus which separates the room from the seat; a wipe clean ceiling having: a central portion overlying the aisle and flanked by strips, each overlying a support portion; for each support portion, a wipe clean flanking wall extending substantially vertically from the edge of the floor; for each flanking wall, a substantially flat, wipe clean inclined wall extending from said each flanking wall to the edge of the ceiling defined by the strip overlying the support portion for which said flanking wall is provided; a plurality of frame members which, in use, are sandwiched between the chassis and the panel members; and at least one furnishing element.

9 Claims, 24 Drawing Sheets

(56) References Cited

U.S. PATENT DOCUMENTS

| | | | | |
|---|---|---|---|---|
| 4,470,228 A * | 9/1984 | Dirck | E04H 3/08 | |
| | | | | 52/106 |
| 4,736,762 A * | 4/1988 | Wayman | A61G 3/001 | |
| | | | | 128/846 |
| 5,080,416 A * | 1/1992 | Dirck | B60R 21/12 | |
| | | | | 52/106 |
| 5,137,321 A * | 8/1992 | Landry | B60P 3/14 | |
| | | | | 296/24.39 |
| 5,890,329 A * | 4/1999 | Krueger | B60P 3/03 | |
| | | | | 52/79.8 |
| 6,270,137 B1 * | 8/2001 | Minix | B60P 3/36 | |
| | | | | 312/246 |
| 6,270,138 B1 * | 8/2001 | Laskowski | B60P 3/14 | |
| | | | | 296/24.44 |
| 7,464,963 B2 * | 12/2008 | Hepner | B60N 2/24 | |
| | | | | 296/64 |
| 7,641,253 B2 * | 1/2010 | Steiger | B60P 3/14 | |
| | | | | 296/24.4 |
| 8,157,312 B2 * | 4/2012 | Bliss, Jr. | B60P 3/14 | |
| | | | | 224/403 |
| 8,500,183 B2 * | 8/2013 | Malley | B60R 11/06 | |
| | | | | 224/543 |
| 10,017,098 B2 * | 7/2018 | Ronsen | B60P 3/34 | |
| 10,343,586 B2 * | 7/2019 | Stoetzl | B60P 3/341 | |
| 2003/0178869 A1 * | 9/2003 | Adams | B60R 13/01 | |
| | | | | 296/39.1 |
| 2006/0033351 A1 * | 2/2006 | Taylor | B60P 3/14 | |
| | | | | 296/24.3 |
| 2006/0125264 A1 * | 6/2006 | Bergeron | B60P 3/14 | |
| | | | | 296/24.39 |
| 2011/0115245 A1 * | 5/2011 | Engelbrecht | A61G 3/0209 | |
| | | | | 296/19 |
| 2011/0254306 A1 * | 10/2011 | Nelson | B60R 13/0815 | |
| | | | | 296/39.1 |
| 2013/0118948 A1 * | 5/2013 | Noyes | G01N 33/205 | |
| | | | | 206/569 |
| 2014/0054916 A1 * | 2/2014 | Knudtson | B62D 33/046 | |
| | | | | 296/24.3 |
| 2015/0102631 A1 * | 4/2015 | Maclean | B62D 33/046 | |
| | | | | 296/156 |
| 2015/0217705 A1 * | 8/2015 | De La Huerta Diaz | | |
| | | | B60R 13/013 | |
| | | | | 296/39.1 |
| 2016/0023700 A1 * | 1/2016 | Dugan | A61G 21/00 | |
| | | | | 296/24.33 |
| 2017/0106780 A1 * | 4/2017 | Tovornik | B60P 3/14 | |
| 2017/0339350 A1 * | 11/2017 | Üstün | B60P 3/14 | |
| 2019/0135354 A1 * | 5/2019 | West | B62D 33/04 | |
| 2021/0009041 A1 * | 1/2021 | Herriman | B60R 11/00 | |
| 2023/0099160 A1 * | 3/2023 | Hong | B60P 7/0815 | |
| | | | | 296/24.44 |
| 2023/0105678 A1 * | 4/2023 | Sargent | E04H 15/42 | |
| | | | | 135/88.13 |
| 2024/0166280 A1 * | 5/2024 | Lee | B62D 33/04 | |
| 2024/0174303 A1 * | 5/2024 | Jones | B62D 33/042 | |
| 2024/0217594 A1 * | 7/2024 | Shi | F16B 5/0208 | |
| 2025/0304178 A1 * | 10/2025 | Lee | B60R 13/08 | |

* cited by examiner

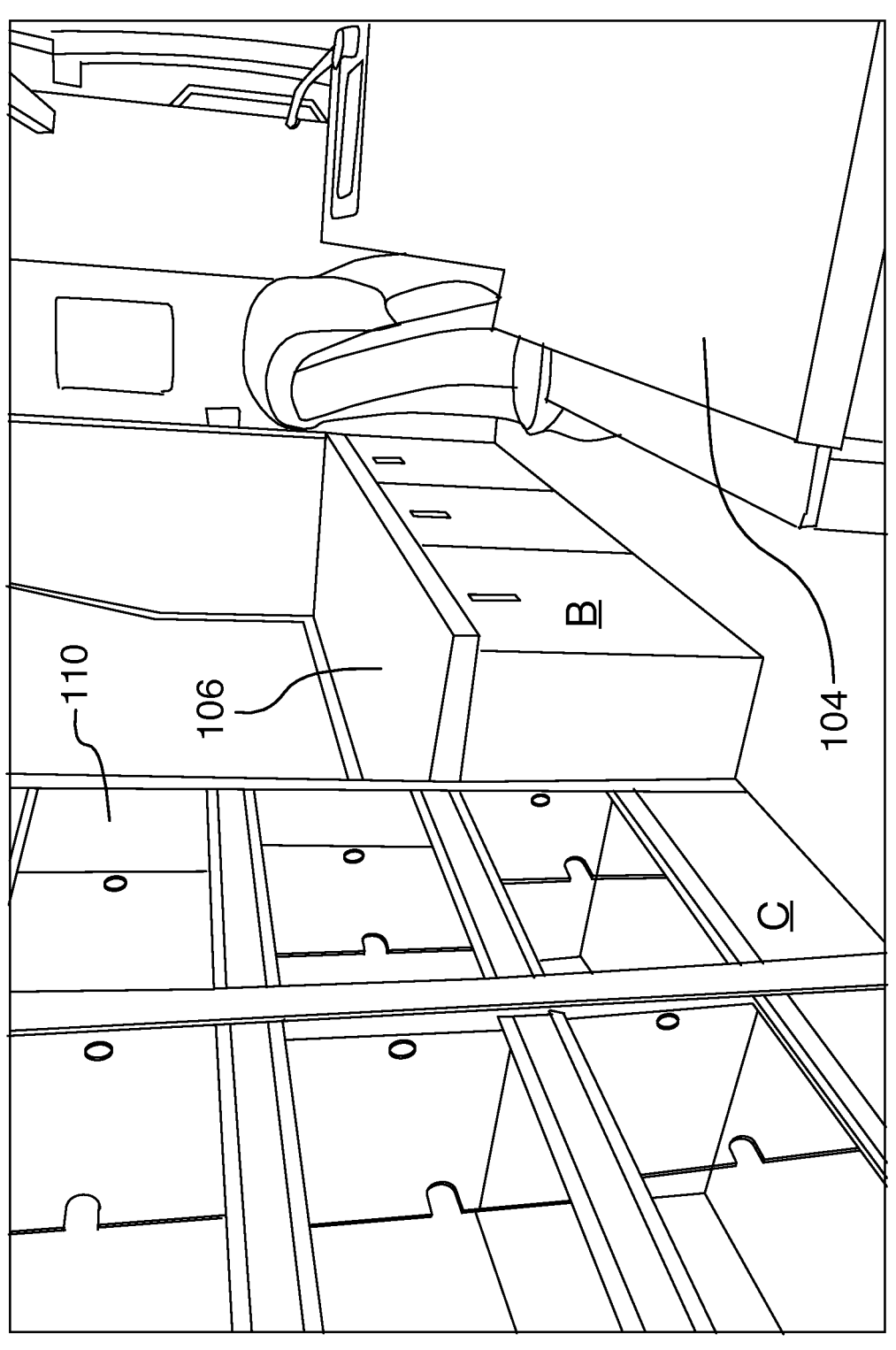
FIG.6.3

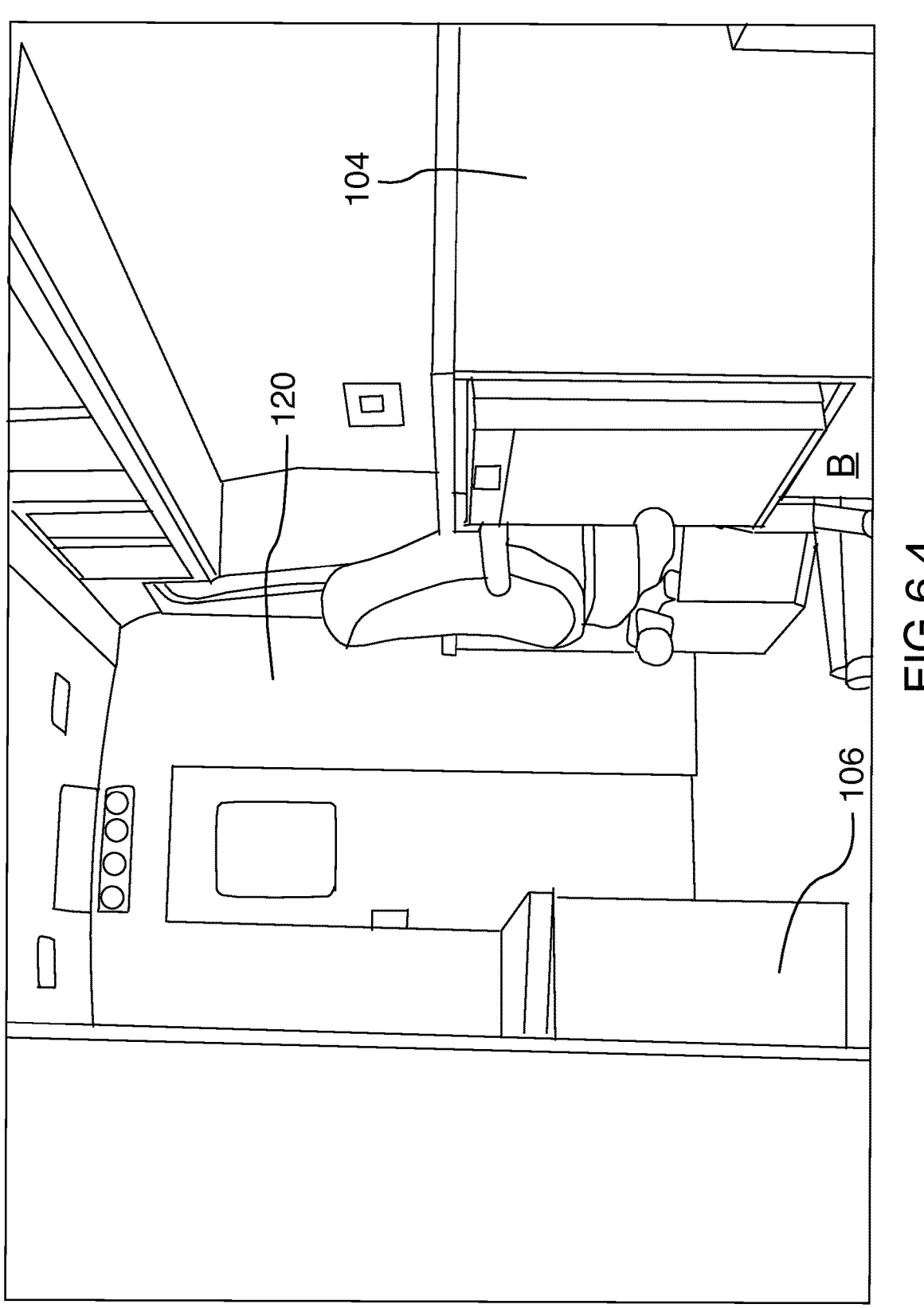
FIG.6.4

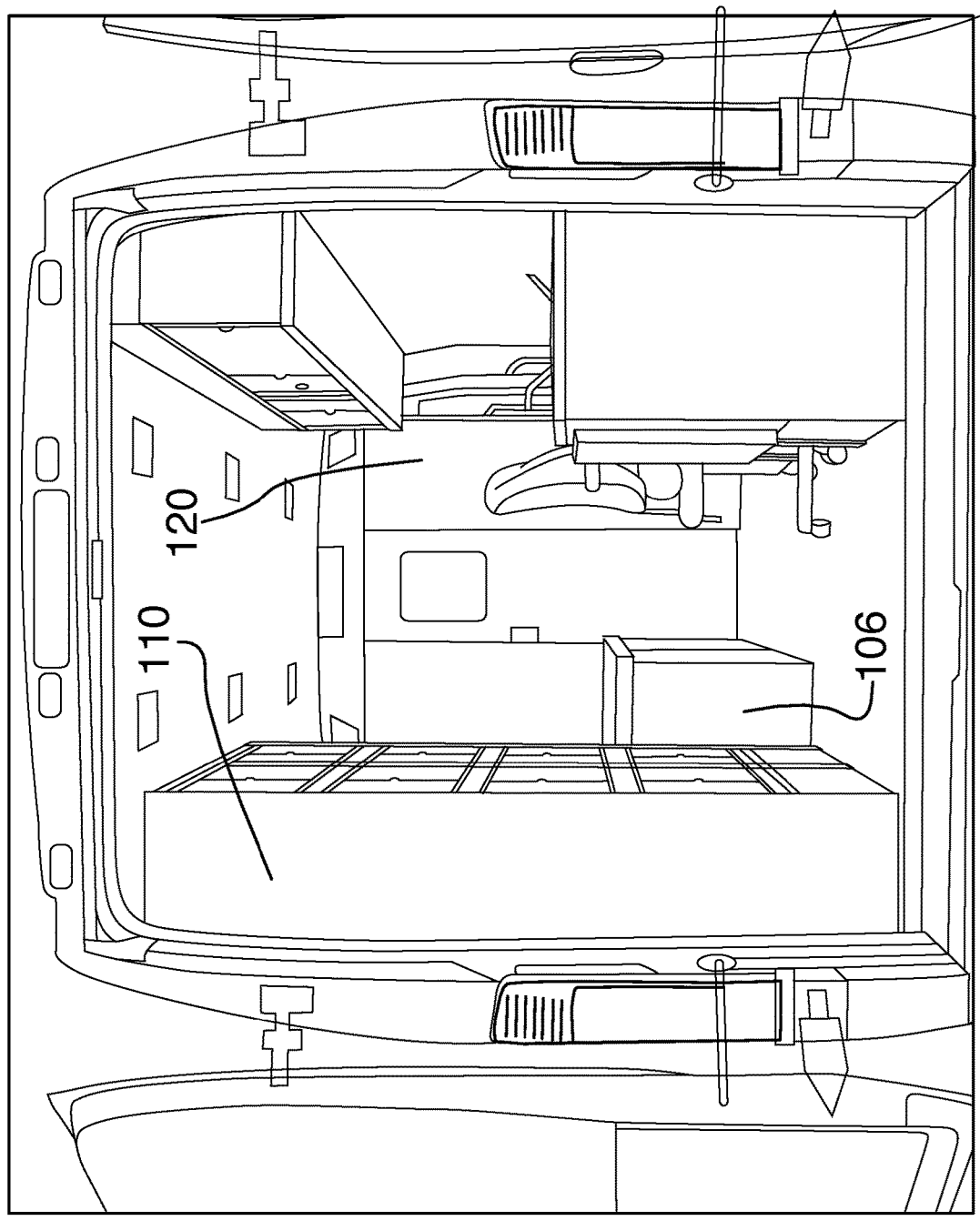
FIG.6.5

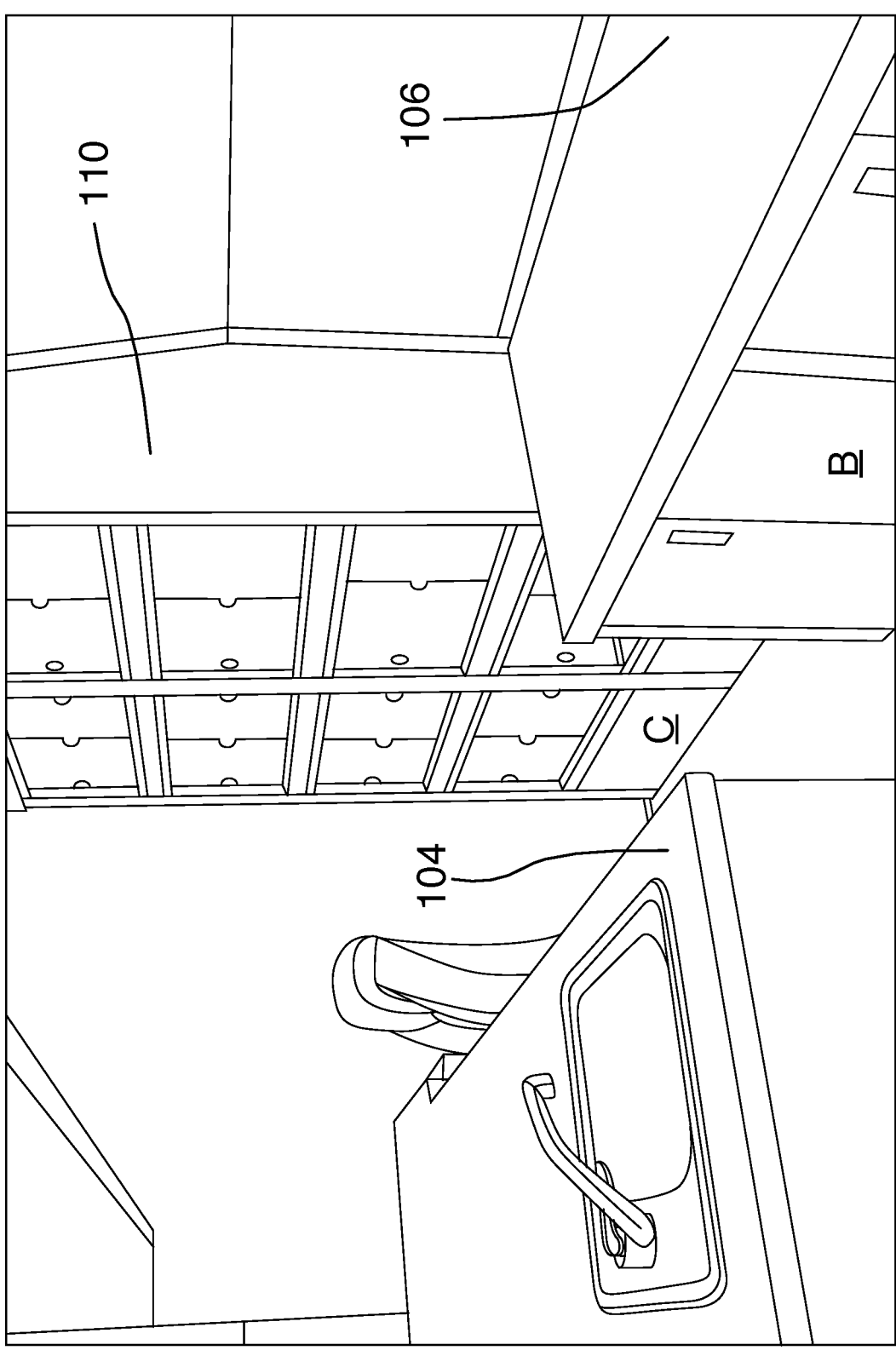
FIG. 6.6

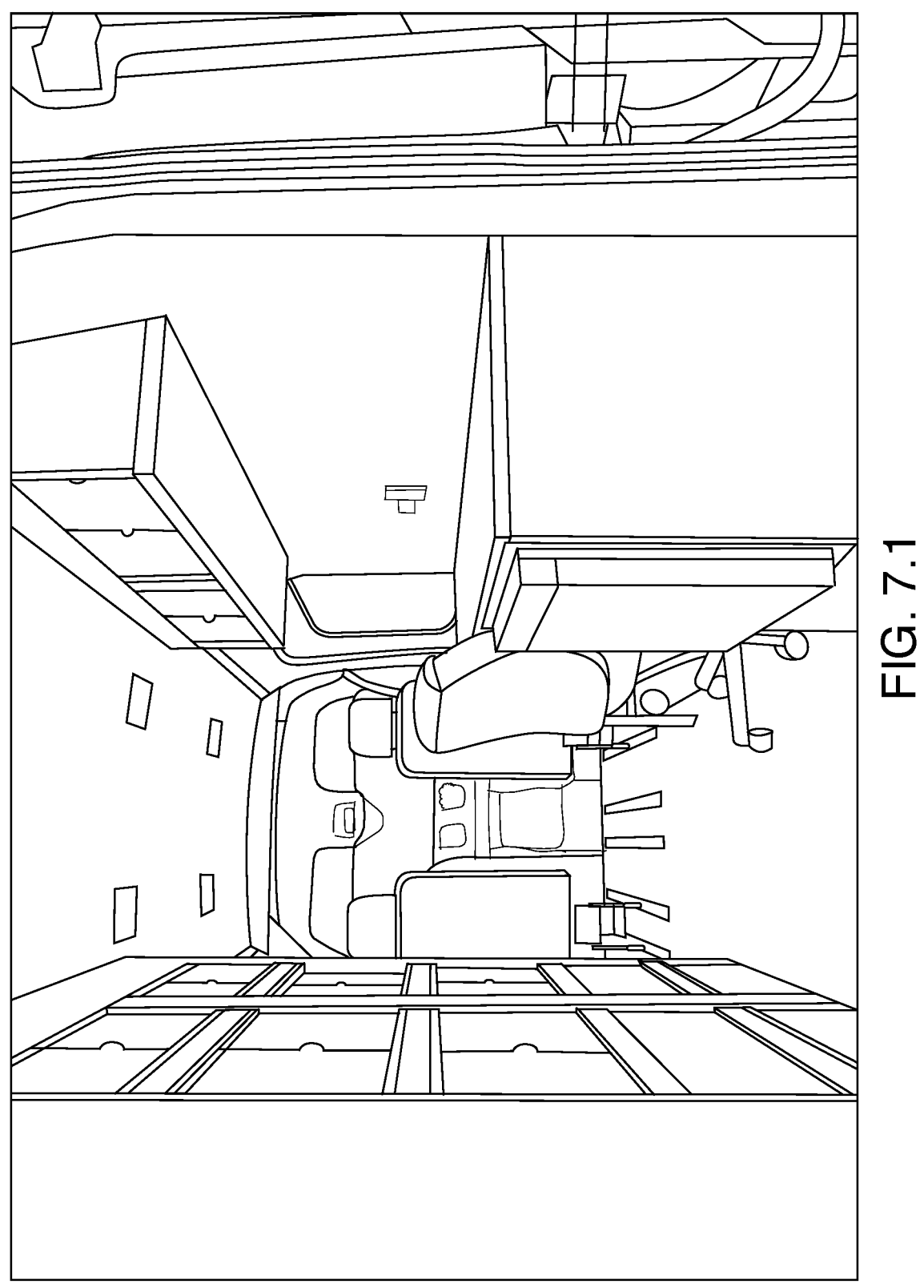
FIG. 7.1

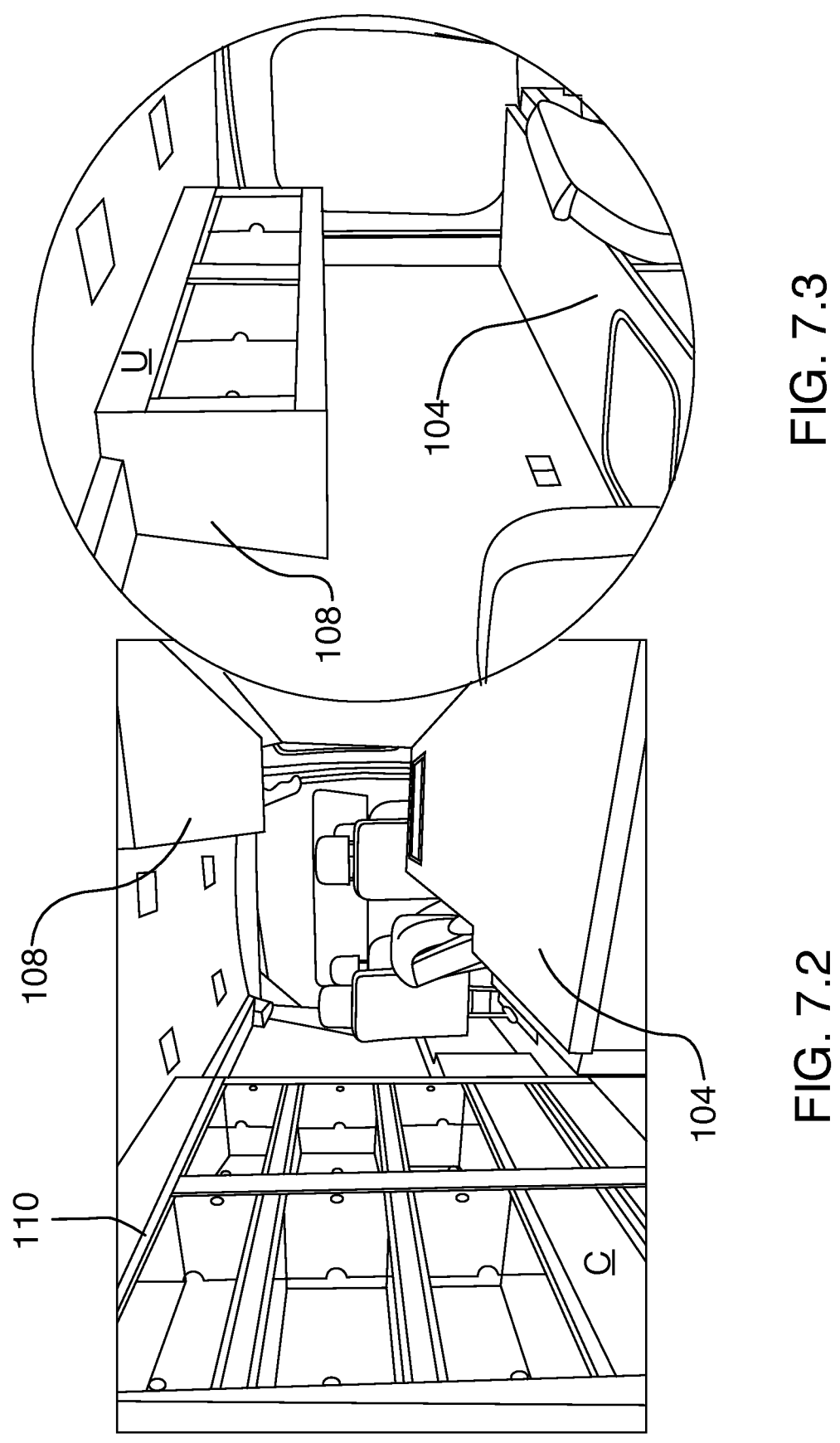
FIG. 7.3
FIG. 7.2

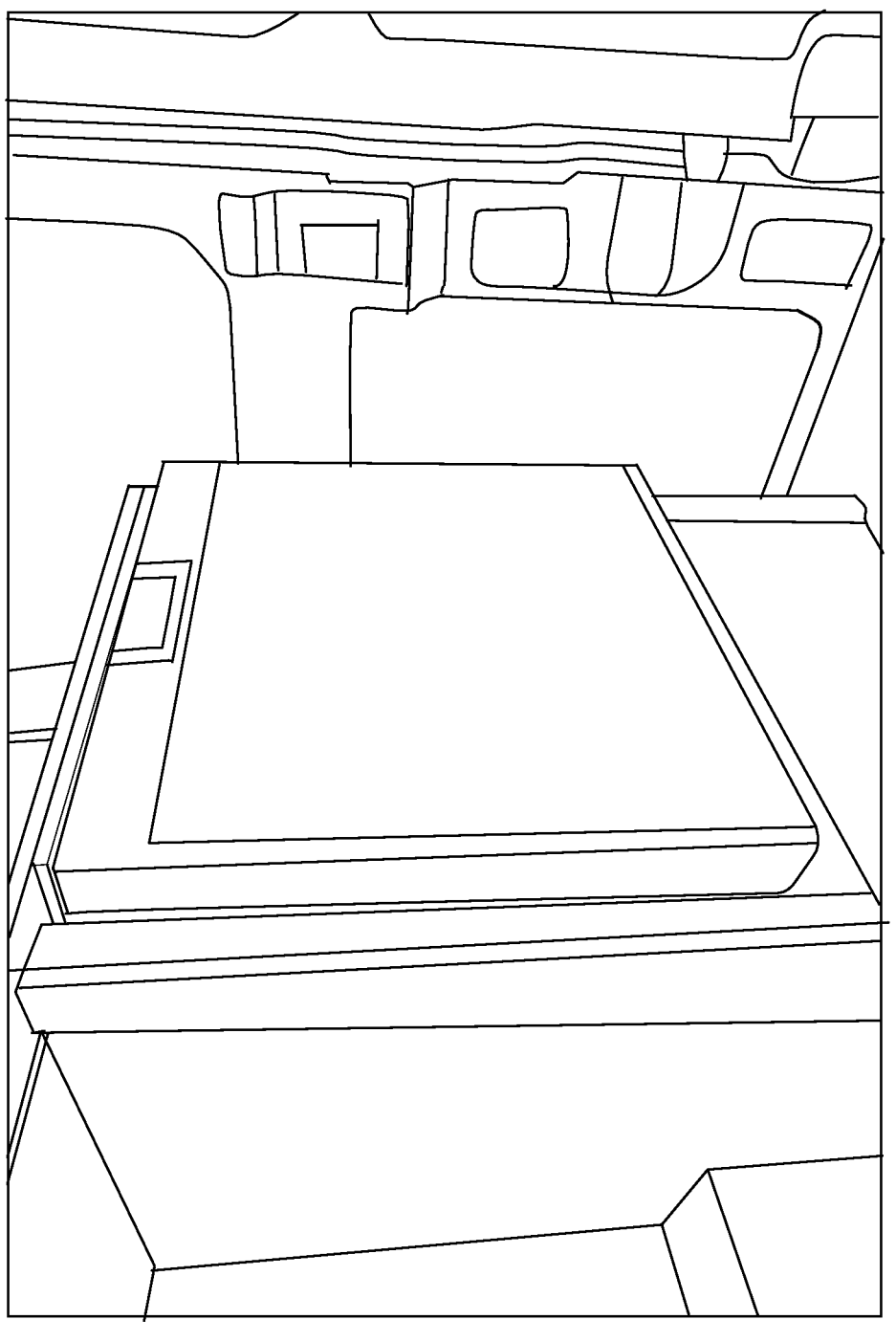
FIG. 7.4

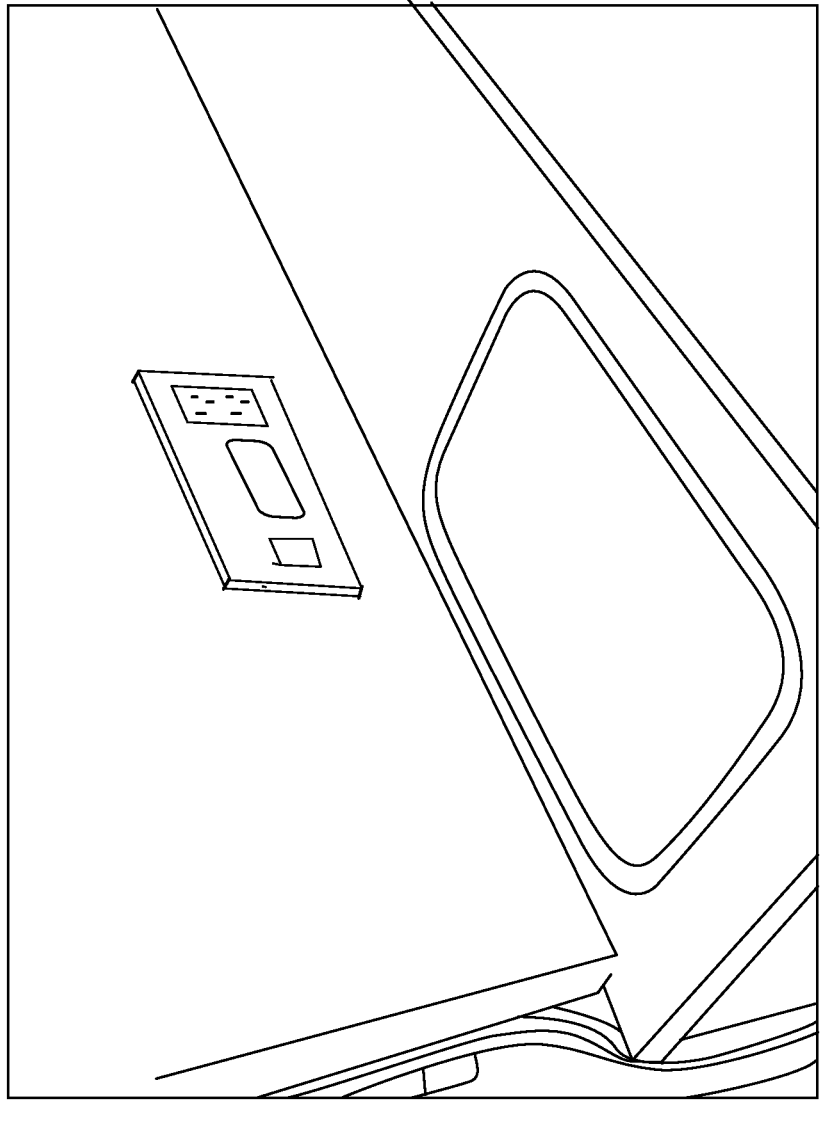
FIG. 7.5

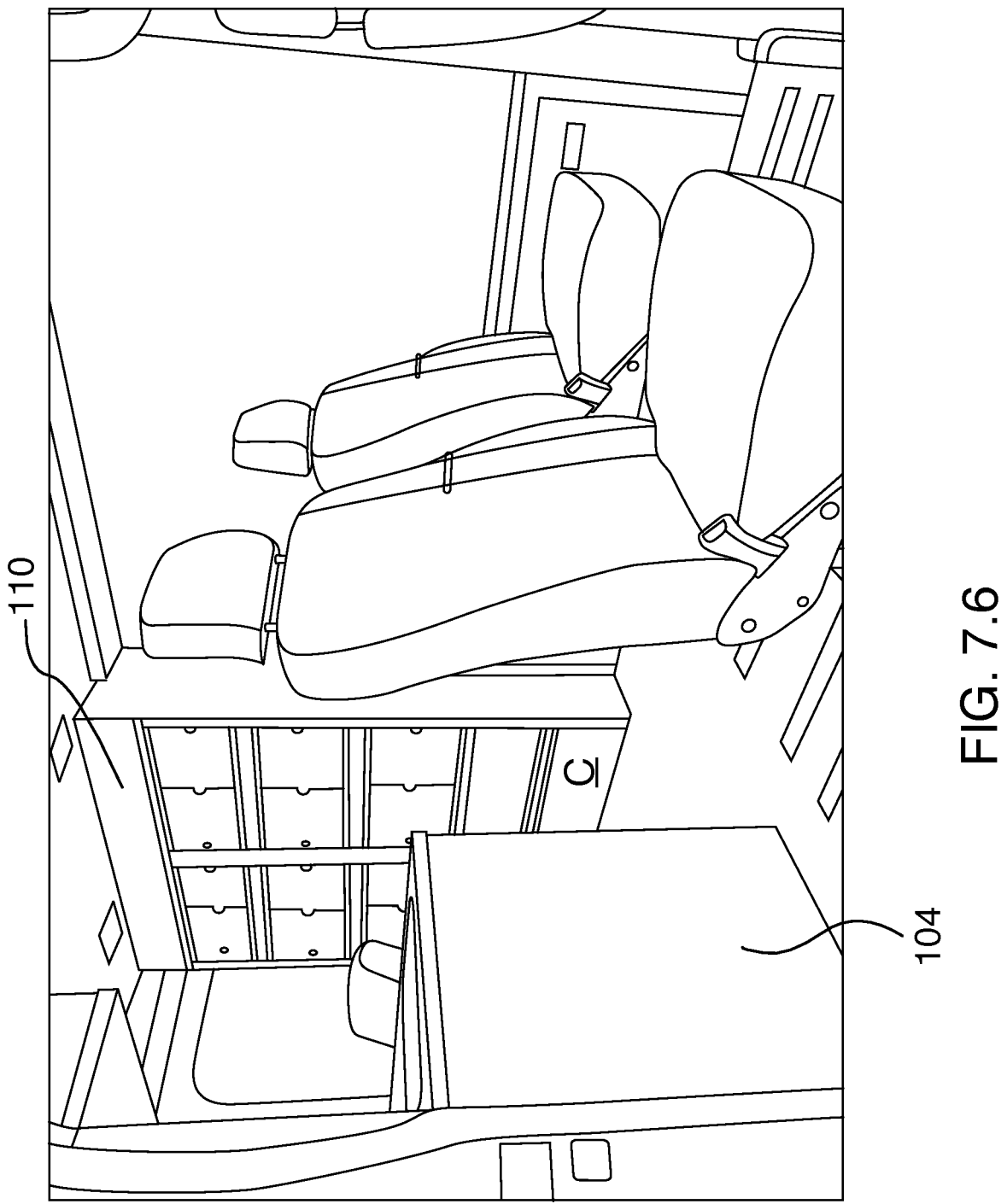
FIG. 7.6

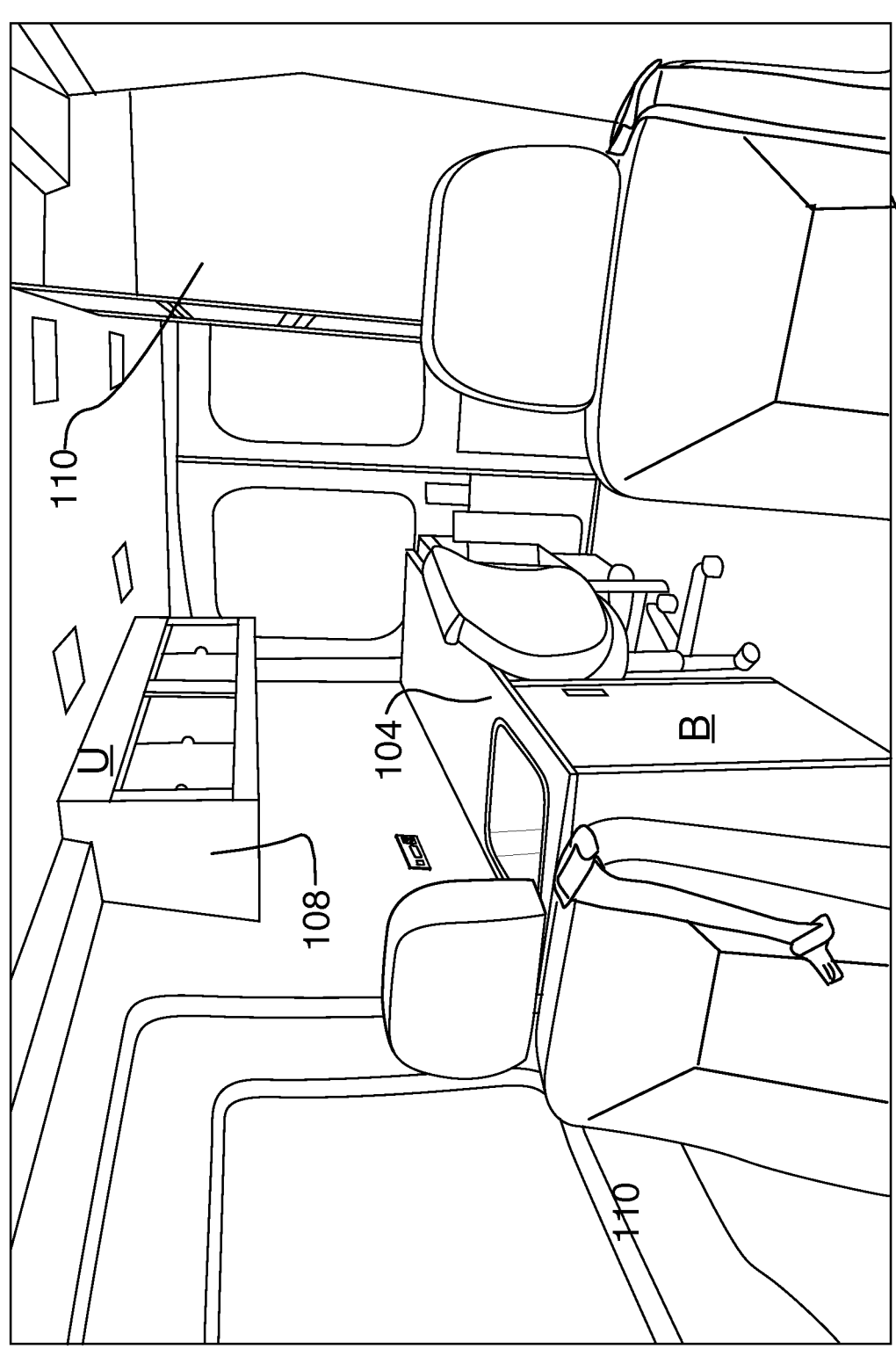
FIG. 7.7

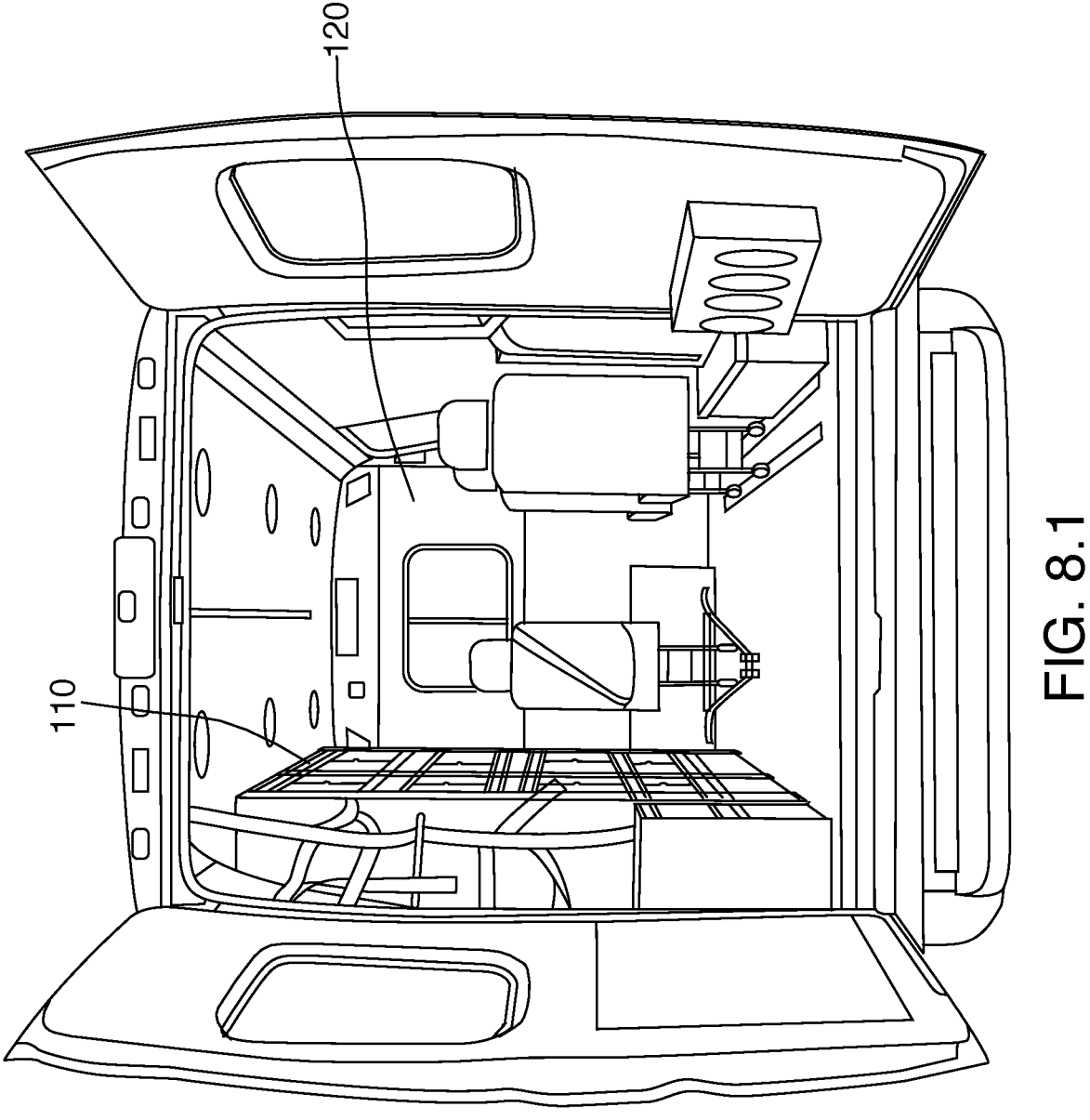
FIG. 8.1

MODULAR SYSTEM AND METHOD FOR PRODUCING MOBILE WORKSTATIONS

CROSS-REFERENCE TO RELATED APPLICATIONS

This application claims Paris Convention priority to U.S. Provisional Patent Application Ser. No. 63/422,630, filed Nov. 4, 2022.

FIELD OF THE INVENTION

The invention relates to mobile workstations, and more particularly, to van-based mobile workstations.

BACKGROUND OF THE INVENTION

The production of van-based mobile workstations is generally done in a bespoke manner, and it can be difficult to achieve cost effective levels of flexibility in production.

SUMMARY OF THE INVENTION

System

Forming one aspect of the invention is a system for use with a van chassis, the chassis having a rear cargo area having a floor and a front row seating area, the floor including:

a substantially flat, horizontal, longitudinally extending aisle portion leading from the rear of the chassis to the terminus; and a pair of longitudinally extending support portions flanking the aisle portion.

The system comprises a plurality of panel members, a plurality of frame members and one or more furnishing elements.

The plurality of panel members has a use configuration in the cargo area wherein it defines a room having:

a terminus which separates the room from the front row seating area;

a substantially flat, horizontal, wipe clean ceiling having:

a central portion overlying the aisle portion; and a pair of strips flanking the central portion, each strip overlying a respective one of the support portions;

for each support portion, a substantially flat, longitudinally-extending wipe clean flanking wall extending substantially vertically from the edge of the floor to an elevation between 4 and 5 feet above the floor; and for each flanking wall, a substantially flat, longitudinally extending, wipe clean inclined wall extending from a top edge of said each flanking wall to the edge of the ceiling defined by the strip overlying the support portion for which said flanking wall is provided.

The plurality of frame members has a use configuration in the cargo area, exterior of the room, wherein the frame members are sandwiched between the chassis and the panel members and structurally support at least the flanking walls, inclined walls and ceiling.

Each of the one or more furnishing elements has a use configuration wherein it does one or more of:

defines a substantially flat, longitudinally-extending base surface extending substantially vertically from one of the support portions; and extends fully to the base surface from the flanking wall provided for said support portion;

defines a substantially flat, longitudinally-extending upper surface extending substantially vertically from one of the strips; and extends fully to the upper surface from the inclined wall provided for the flanking wall that extends from the support surface overlain by the strip; and defines a substantially flat, longitudinally-extending combination surface extending substantially vertically from one of the support portions to the strip overlying the support portion; extends fully to the combination surface from the flanking wall provided for said support portion; and extends fully to the combination surface from the inclined wall provided for the flanking wall that extends from the support surface overlain by the strip.

According to another aspect of the invention, the room can have a substantially flat, vertical, wipe clean partition defining the terminus.

According to another aspect of the invention, the at least one furnishing element can comprise a desk which defines the base surface.

According to another aspect of the invention, the at least one furnishing element can comprise a bed which defines the base surface.

According to another aspect of the invention, the at least one furnishing element can comprise an over-desk cabinet which defines the upper surface.

According to another aspect of the invention, the at least one furnishing element can comprises a wall cabinet which defines the combination surface.

Method

Forming another aspect of the invention is a method for producing a van from a van chassis and a floor, the chassis having a front row seating area and also having a rear cargo area containing the floor, the floor including:

a substantially flat, horizontal, longitudinally extending aisle portion leading from the rear of the chassis to the terminus; and a pair of longitudinally extending support portions flanking the aisle portion.

The method comprises the steps of:

securing the frame members to the van chassis;

securing the panel members to the frame members to define the room; and operatively mounting to the room at least one furnishing element.

Advantages, features and characteristics of the invention will become apparent upon a review of the following detailed description, with reference to the appended illustrations, the latter being briefly described hereinafter.

BRIEF DESCRIPTION OF THE ILLUSTRATIONS

In the illustrations:

FIG. 1. is a partial view of a system according to an example embodiment;

Figure 1:
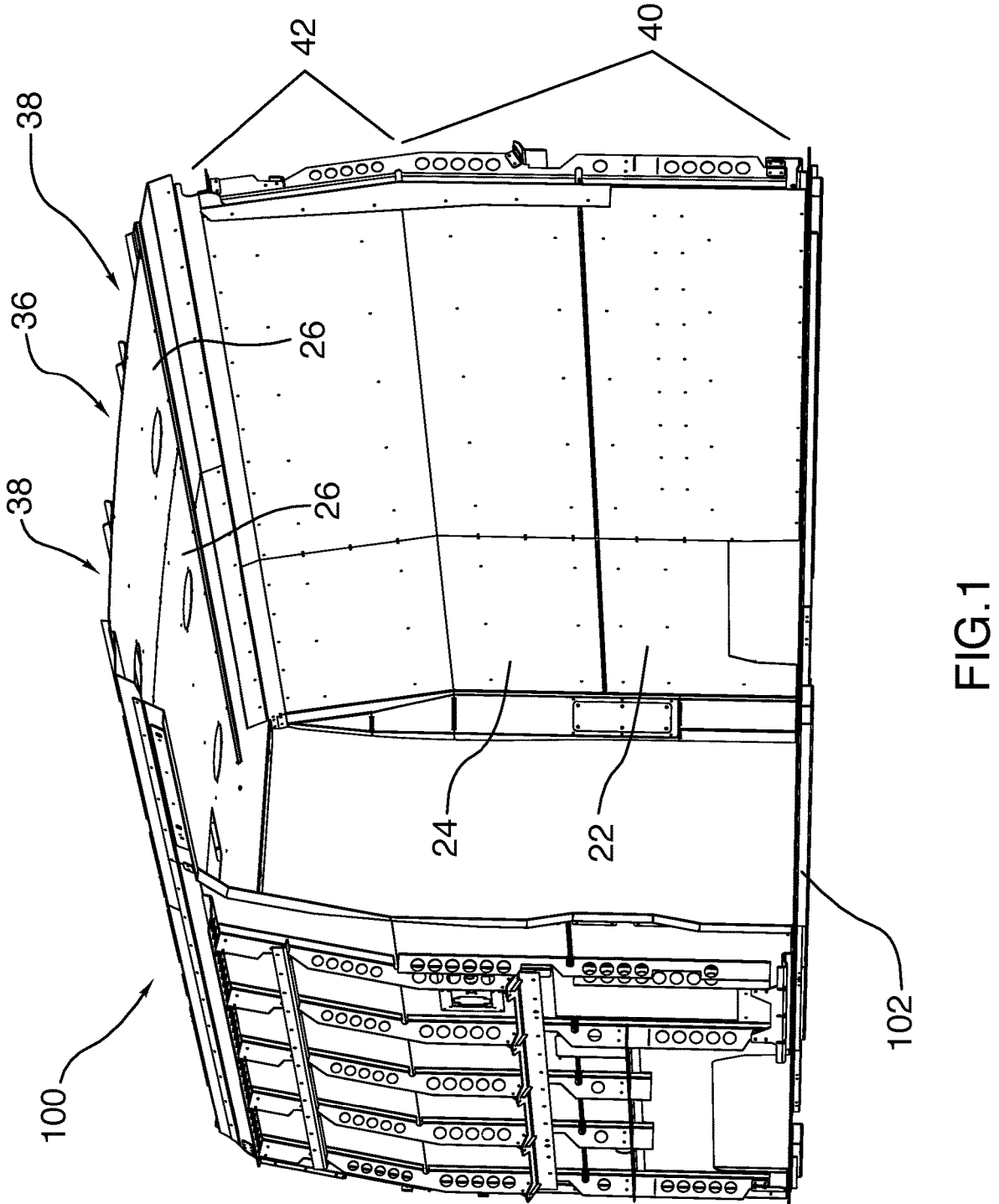
Figure 2:
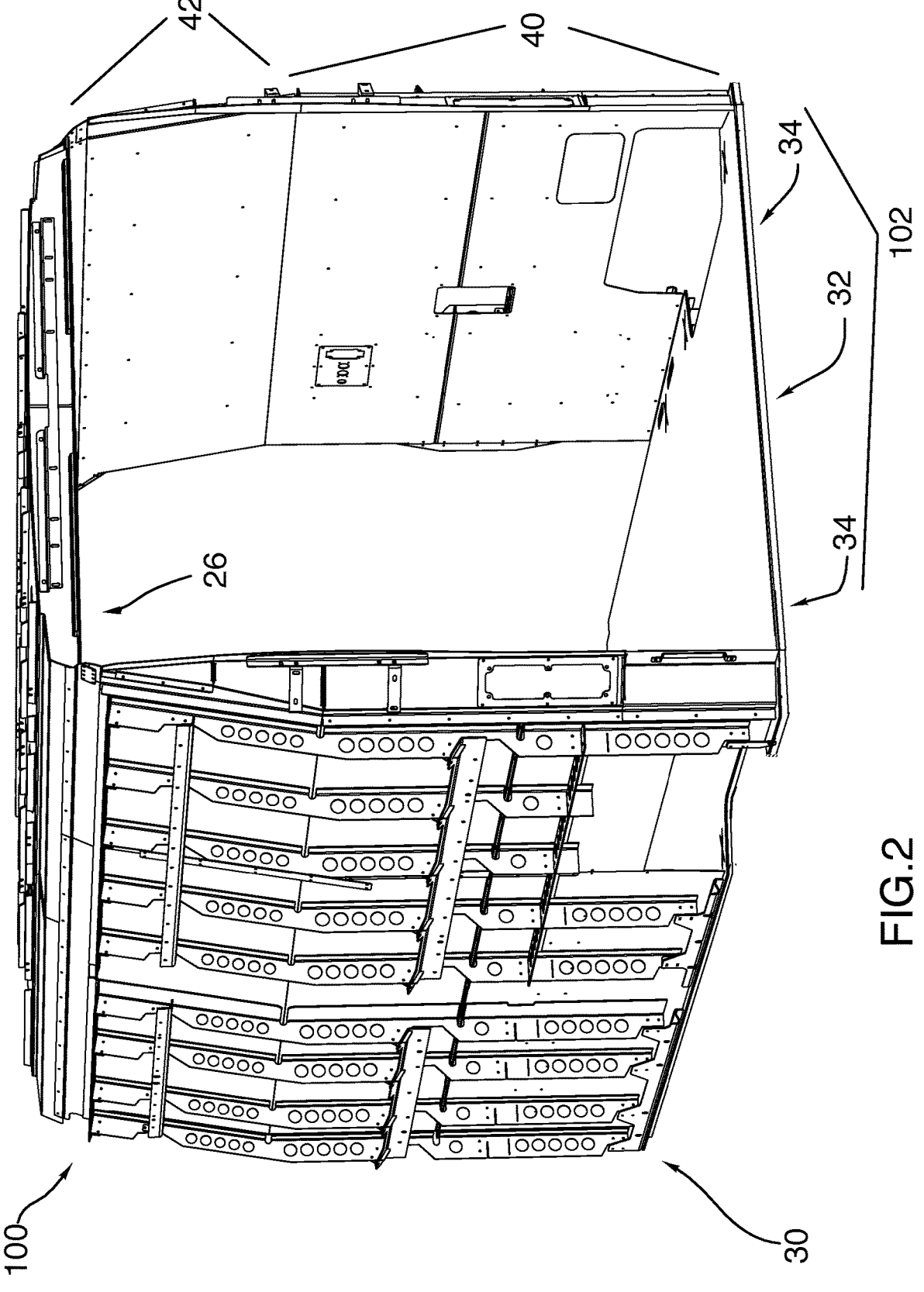
FIG. 2 is a view of the structure of FIG. 1 from another vantage point.
Figure 3:
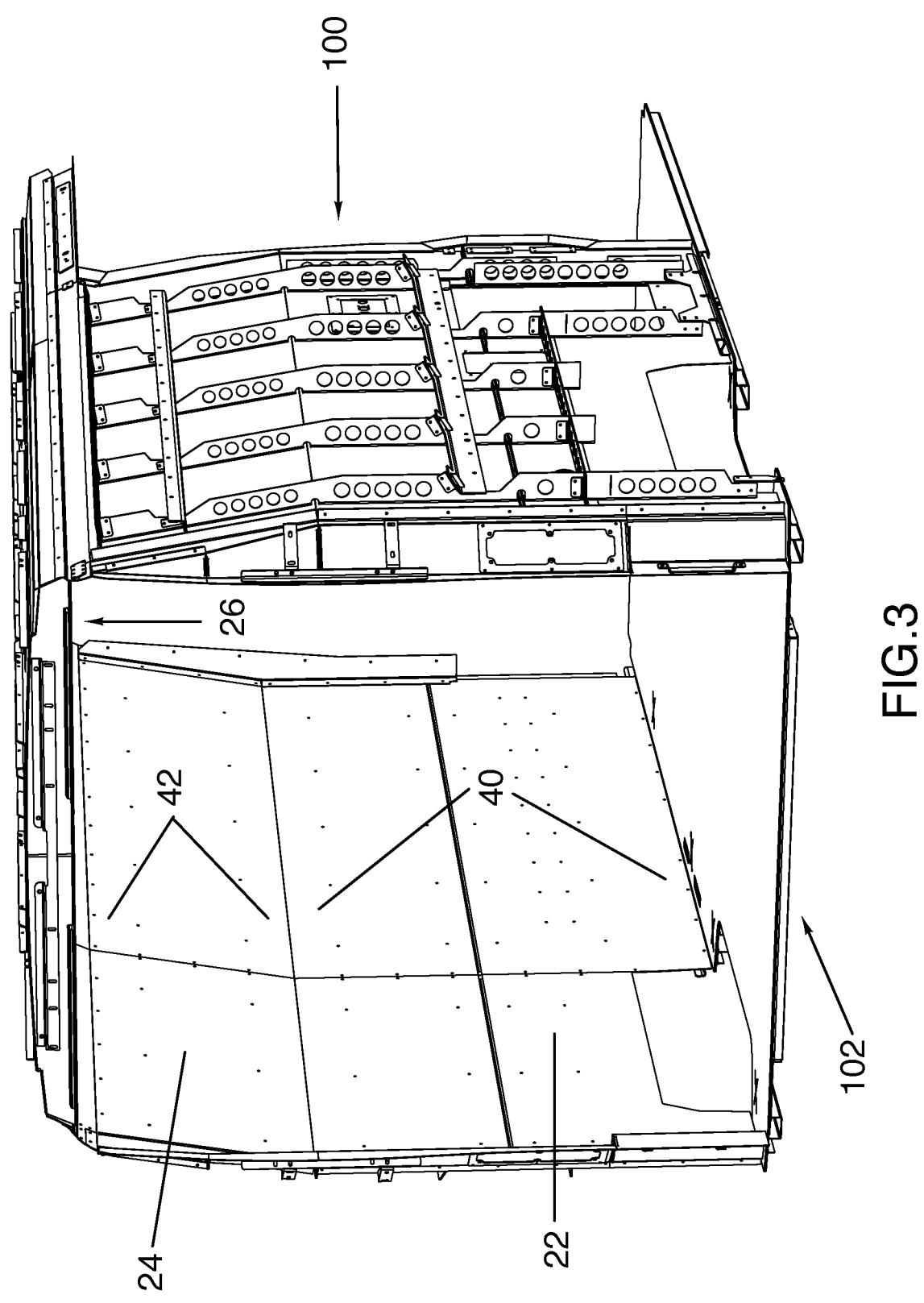
FIG. 3 is a view of the structure of FIG. 1 from another vantage point.
Figure 4:
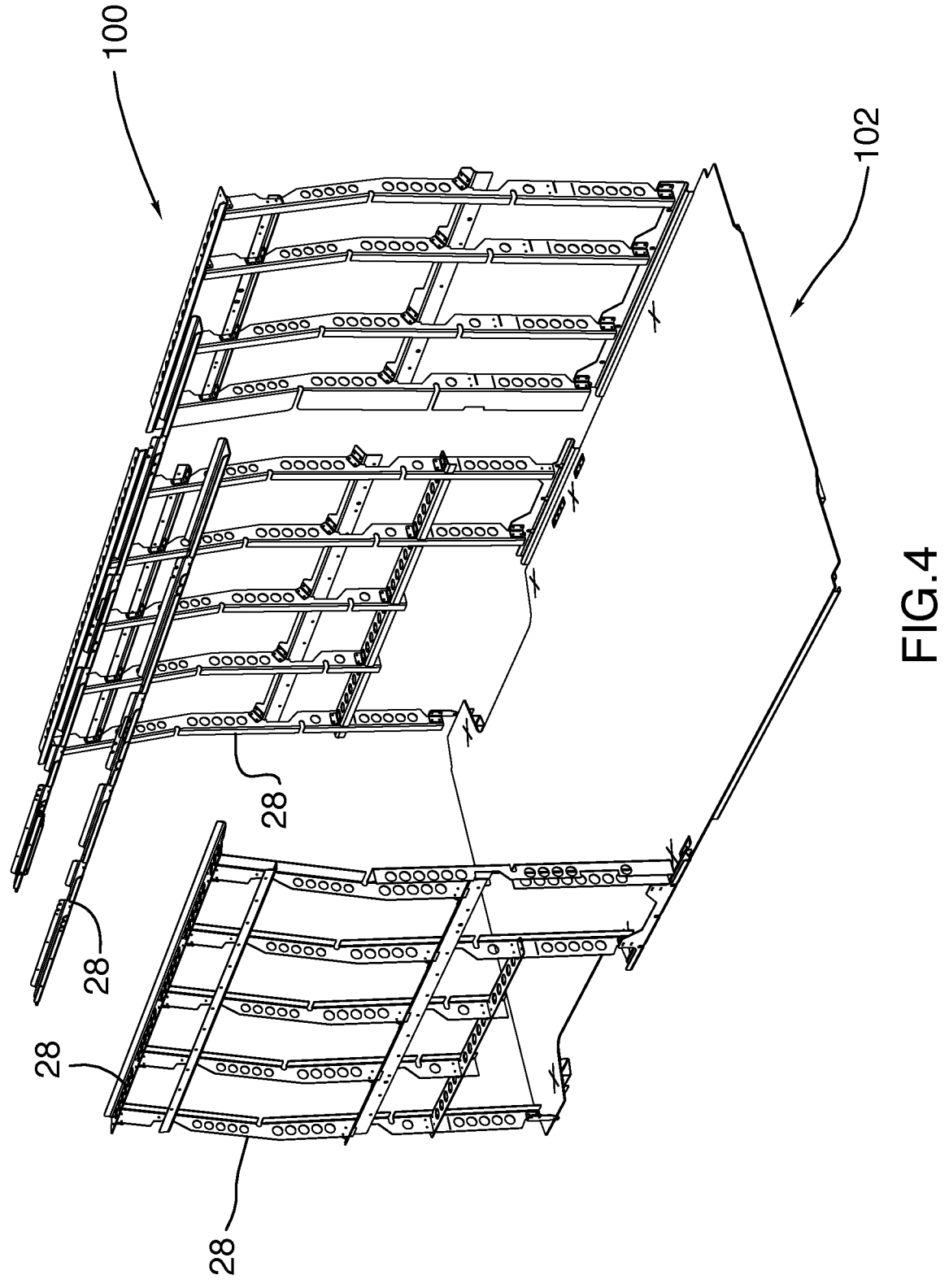
FIG. 4 is a view of the structure of FIG. 1 with the panels removed.
Figure 5:
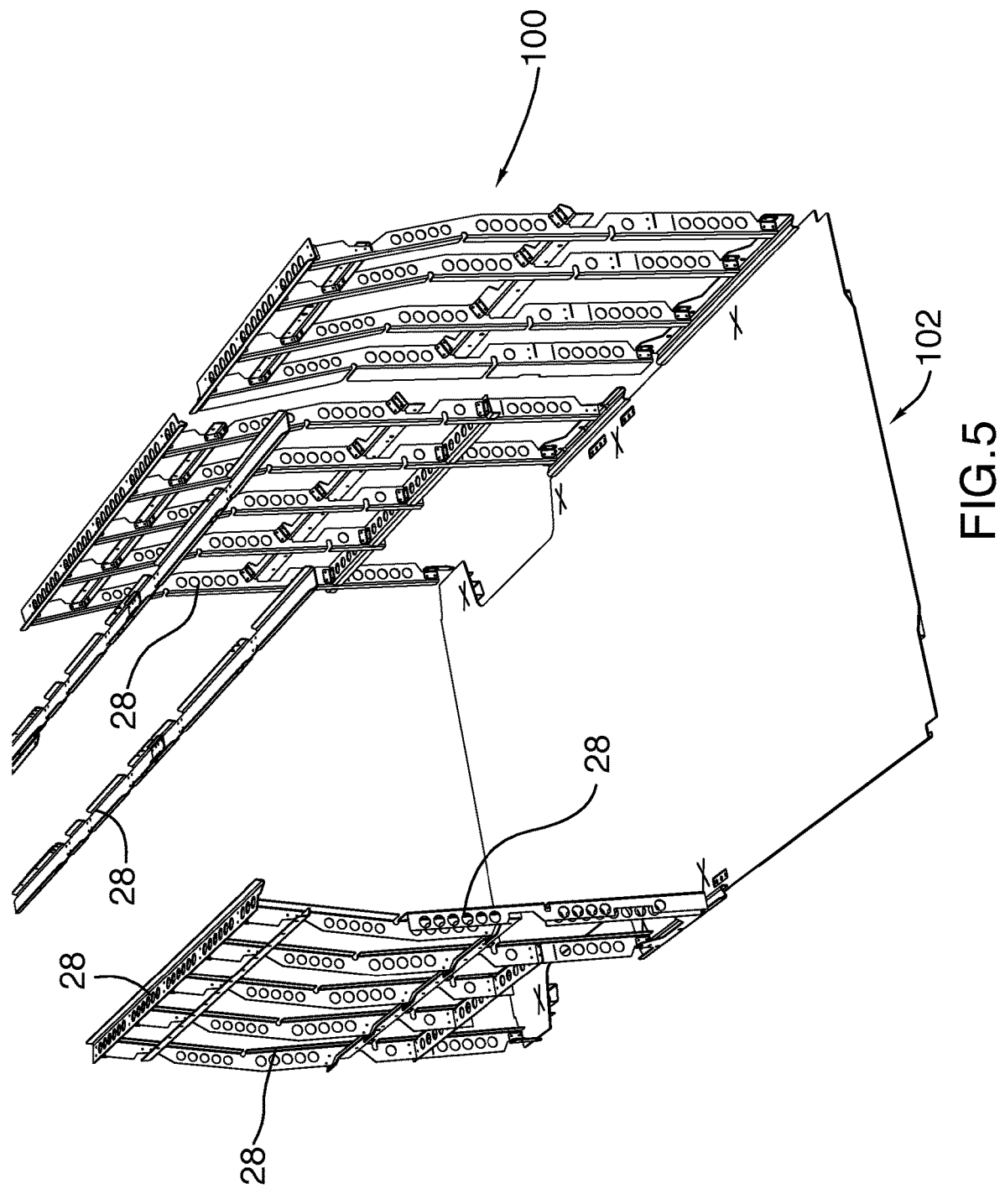
FIG. 5 is another view of the structure of FIG. 4.
Figure 6:
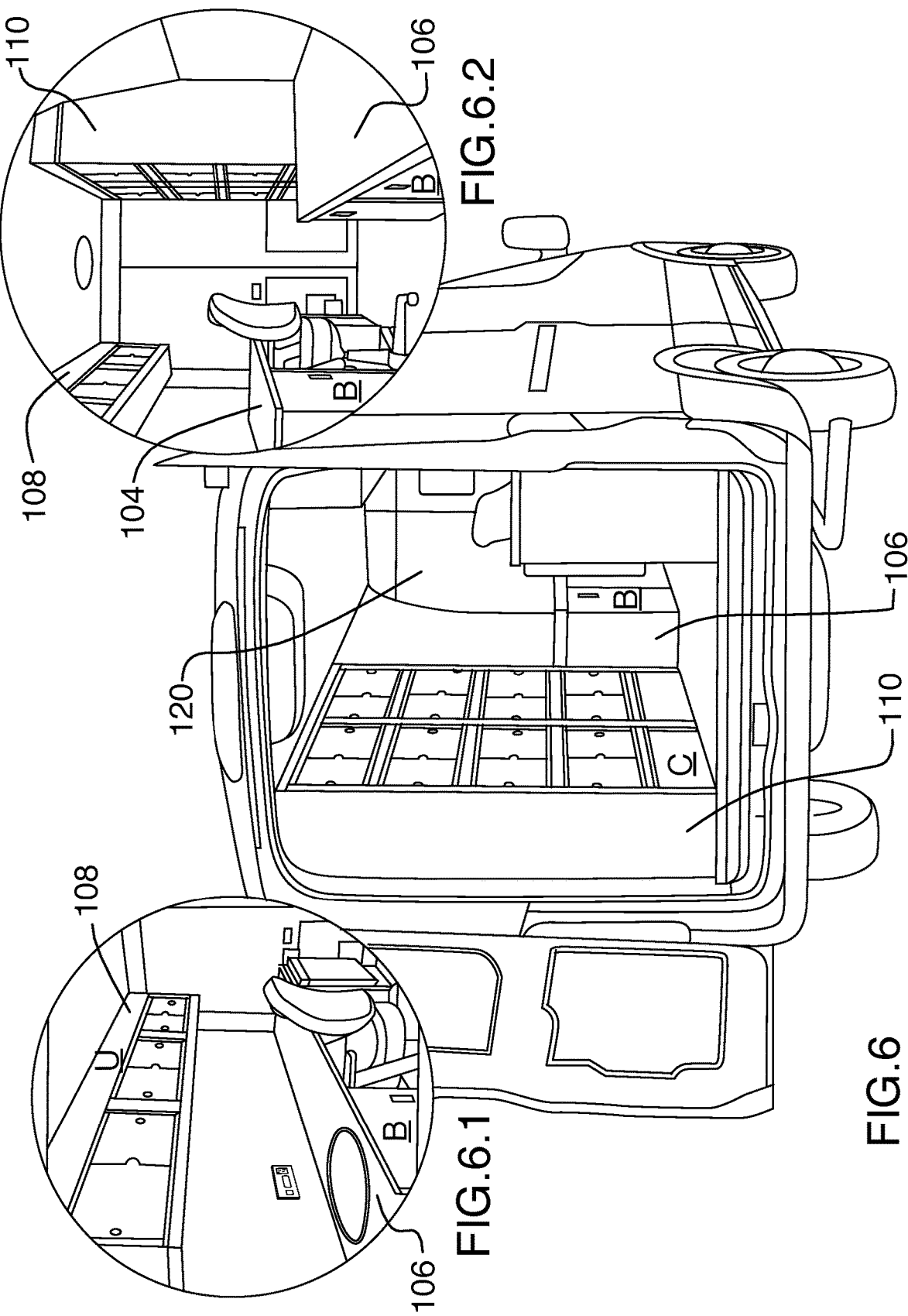
FIG. 6 is a view of a mobile workstation according to an example embodiment

FIG. 6.1 is a detail view of the interior of the structure of FIG. 6

FIG. 6.2 is another detail view of the interior of the structure of FIG. 6

FIG. 6.3 is another detail view of the interior of the structure of FIG. 6

FIG. 6.4 is another detail view of the interior of the structure of FIG. 6

FIG. 6.5 is another detail view of the interior of the structure of FIG. 6

FIG. 6.6 is another detail view of the interior of the structure of FIG. 6

Figure 7:
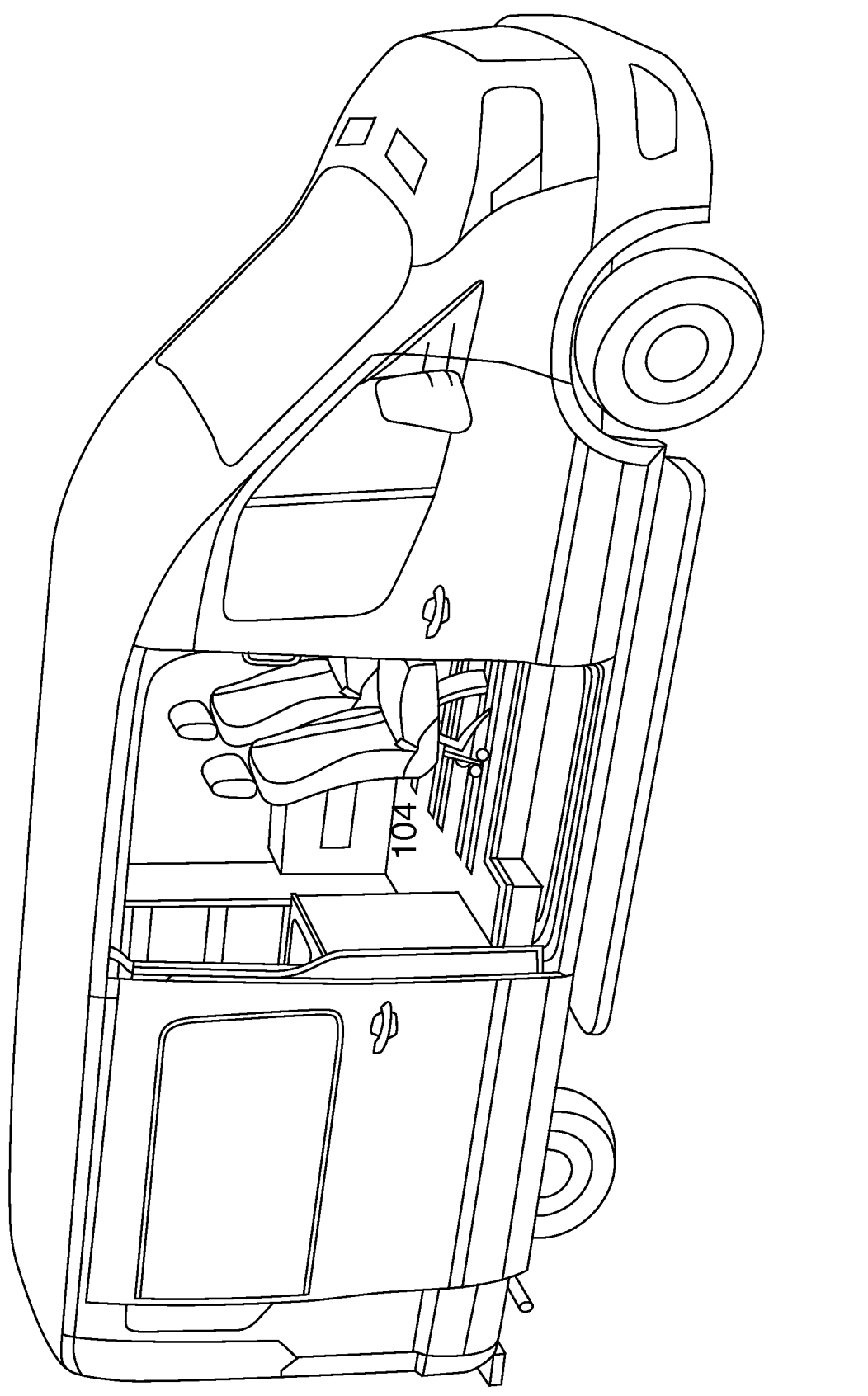

FIG. 7 is a view of a mobile workstation according to an example embodiment

FIG. 7.1 is a detail view of the interior of the structure of FIG. 7

FIG. 7.2 is another detail view of the interior of the structure of FIG. 7

FIG. 7.3 is another detail view of the interior of the structure of FIG. 7

FIG. 7.4 is another detail view of the interior of the structure of FIG. 7

FIG. 7.5 is another detail view of the interior of the structure of FIG. 7

FIG. 7.6 is another detail view of the interior of the structure of FIG. 7

FIG. 7.7 is another detail view of the interior of the structure of FIG. 7

Figure 8:
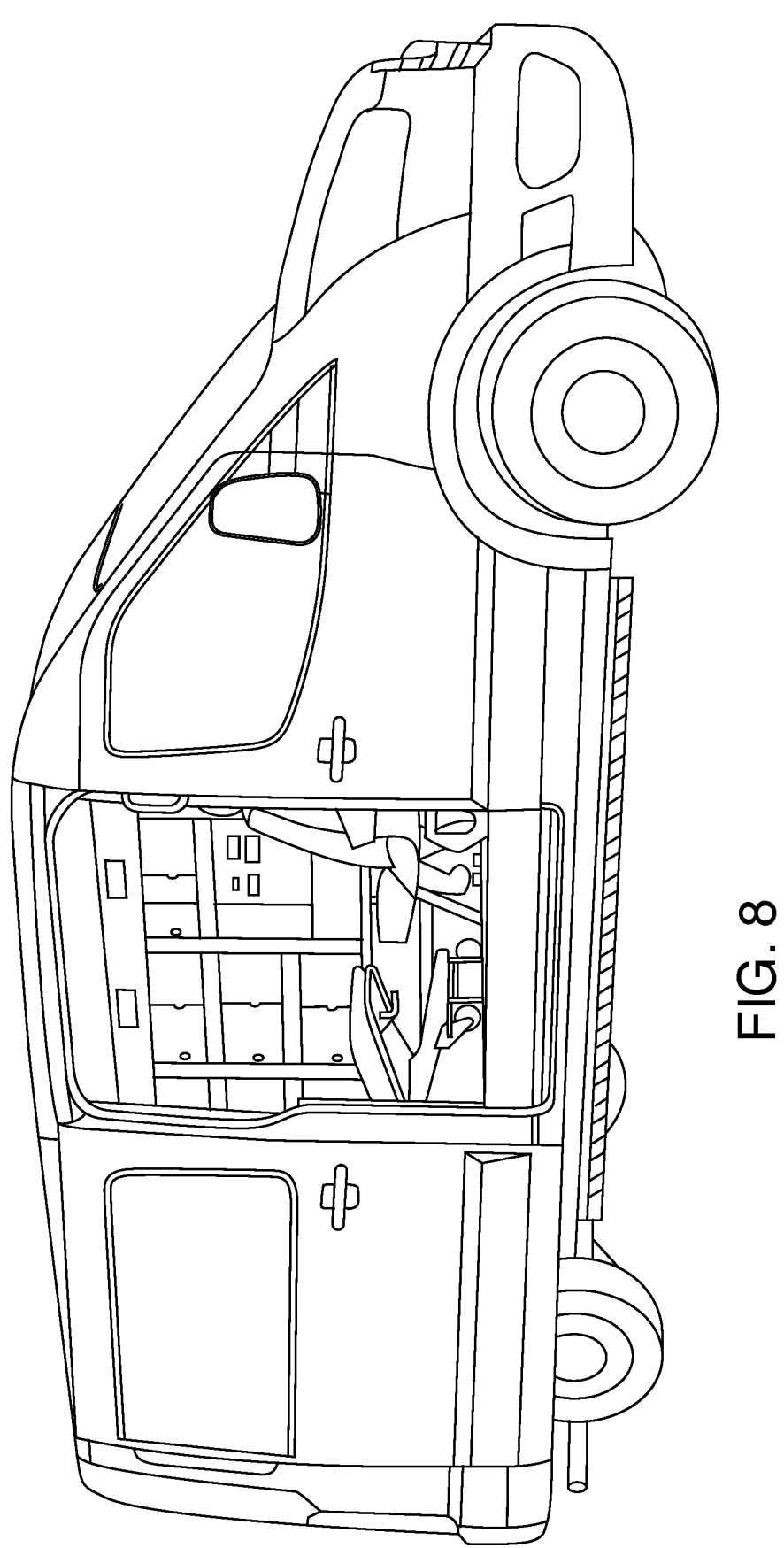

FIG. 8 is a view of a mobile workstation according to an example embodiment

FIG. 8.1 is a view of the interior of the structure of FIG. 8

Figure 10:
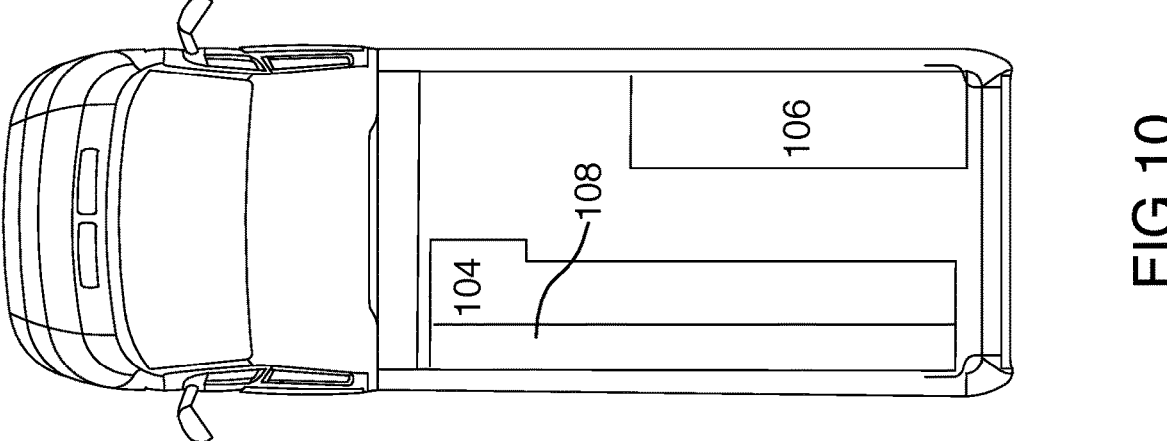
Figure 9:
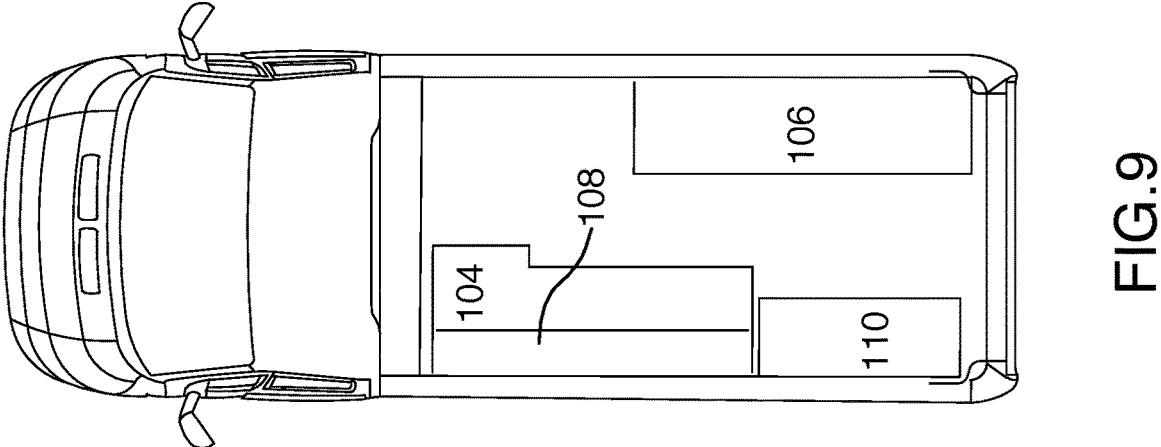
Figures 11, 12, 13:
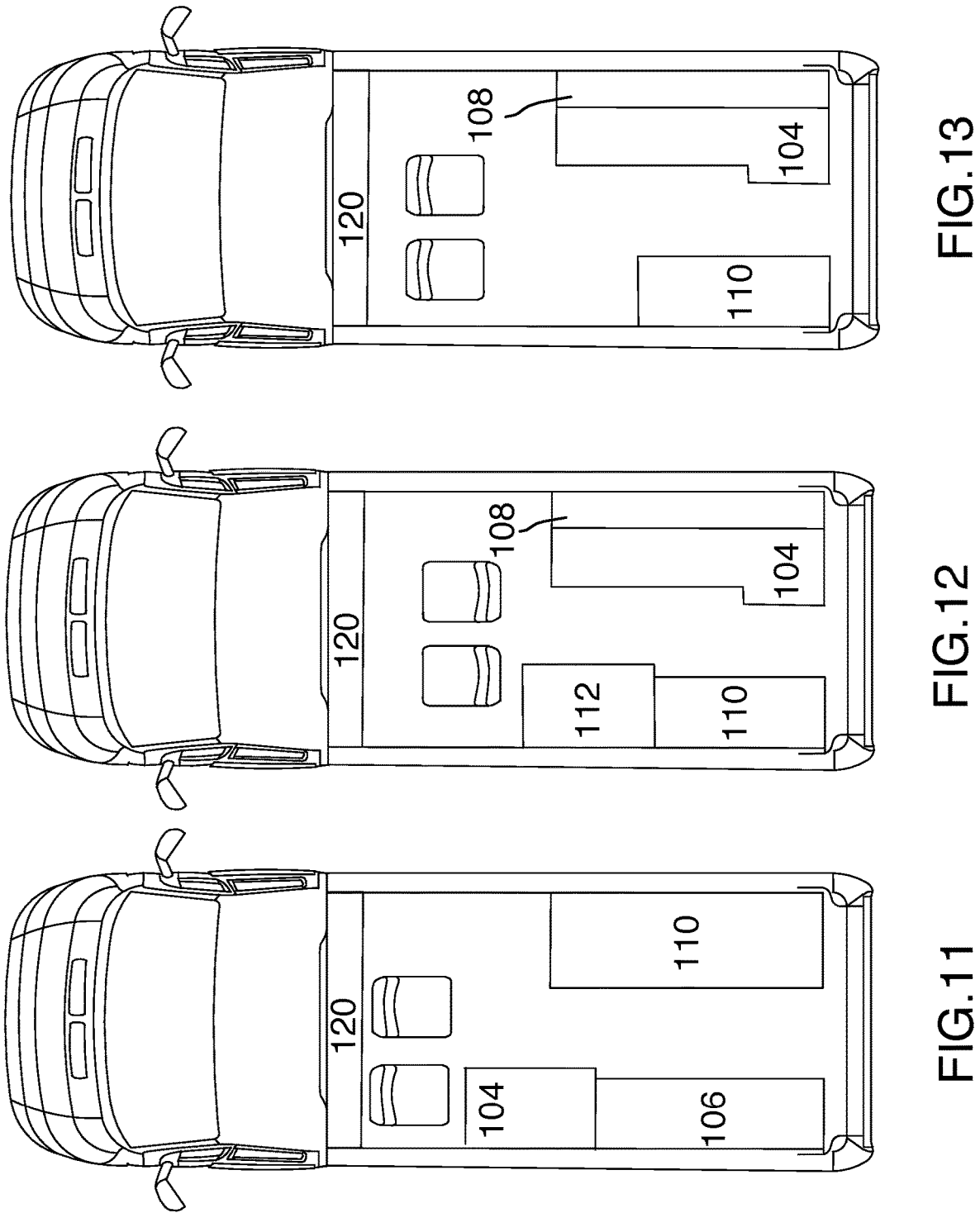
Figures 14, 15, 16:
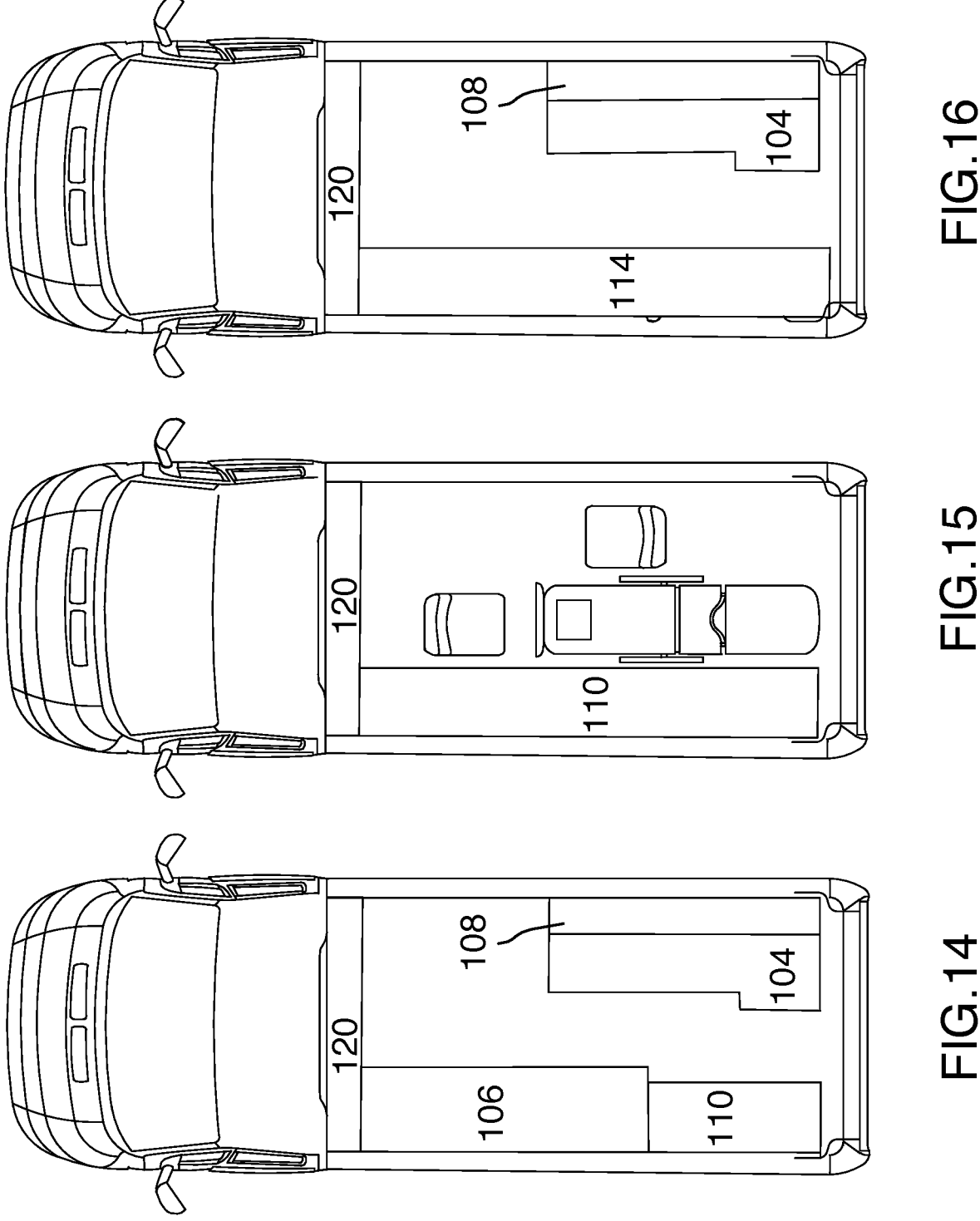
Figures 17, 18, 19:
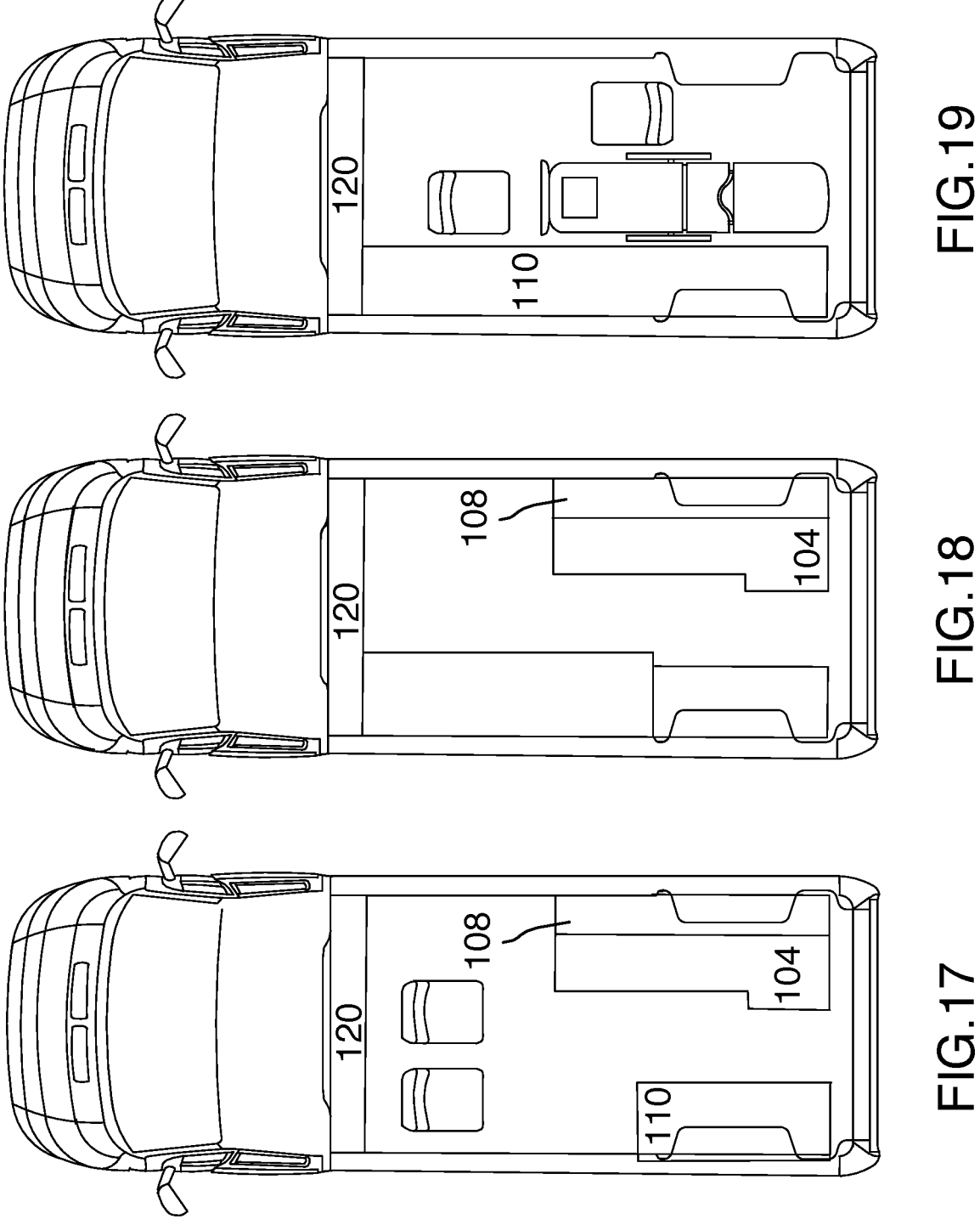
Figures 20, 21, 22:
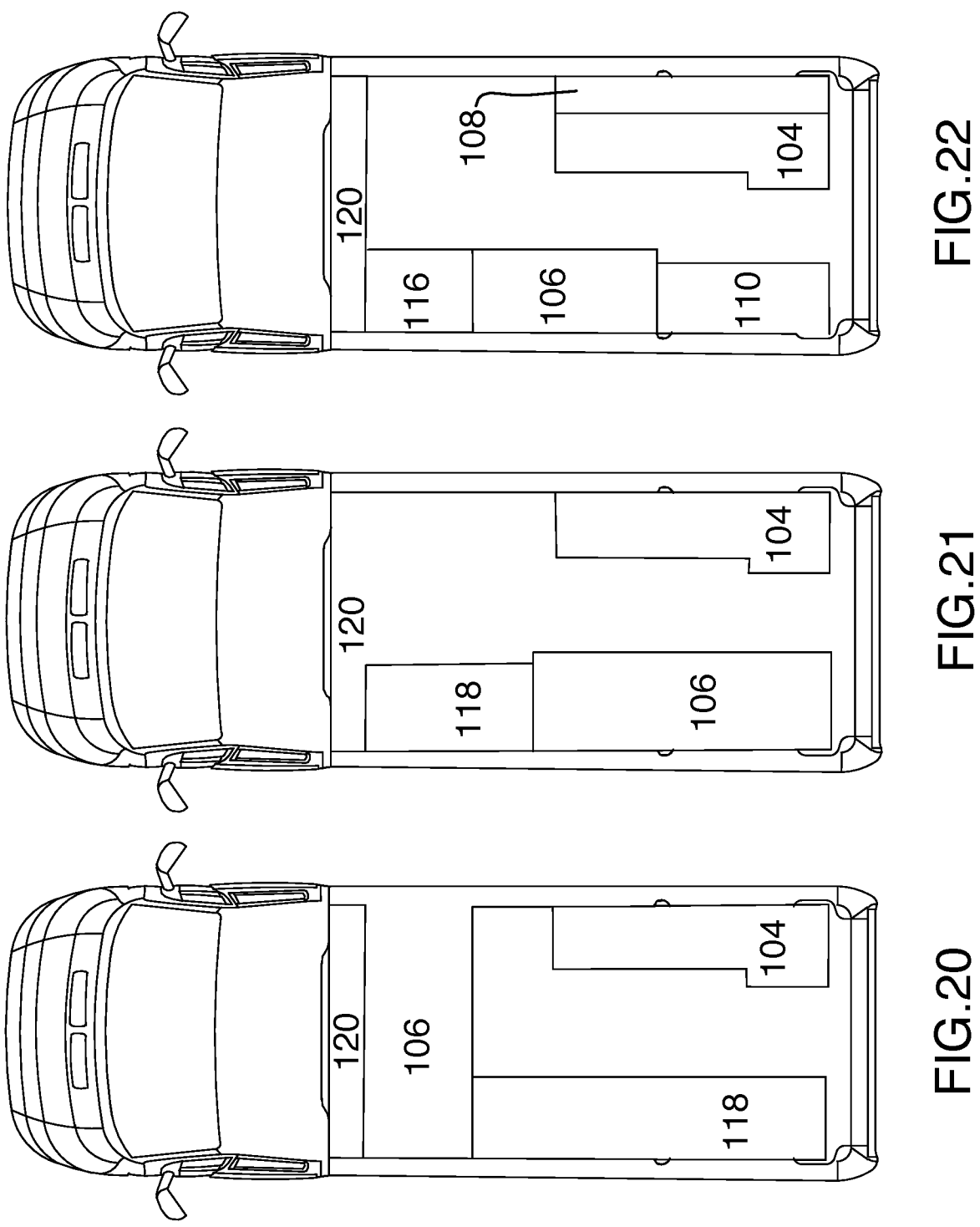

FIG. 9 is a plan view of a mobile workstation according to another example embodiment;

FIG. 10 is a plan view of a mobile workstation according to another example embodiment;

FIG. 11 is a plan view of a mobile workstation according to another example embodiment;

FIG. 12 is a plan view of a mobile workstation according to another example embodiment;

FIG. 13 is a plan view of a mobile workstation according to another example embodiment;

FIG. 14 is a plan view of a mobile workstation according to another example embodiment;

FIG. 15 is a plan view of a mobile workstation according to another example embodiment;

FIG. 16 is a plan view of a mobile workstation according to another example embodiment;

FIG. 17 is a plan view of a mobile workstation according to another example embodiment;

FIG. 18 is a plan view of a mobile workstation according to another example embodiment;

FIG. 19 is a plan view of a mobile workstation according to another example embodiment;

FIG. 20 is a plan view of a mobile workstation according to another example embodiment;

FIG. 21 is a plan view of a mobile workstation according to another example embodiment; and FIG. 22 is a plan view of a mobile workstation according to another example embodiment.

DETAILED DESCRIPTION OF EXAMPLES OF THE INVENTION

One example of the invention is a system 100, shown in part in FIGS. 1-5, which is for use with a van chassis [not shown in FIGS. 1-5] and a van floor 102 and which comprises a plurality of panel members 22, 24, 26 and a plurality of frame members 28. The van, which forms no part of the invention, is of the type that has a rear cargo area and a front row seating area and is a Ford Transit or Dodge Promaster. The cargo area contains the floor 102 which includes: a substantially flat, horizontal, longitudinally extending aisle portion 32 leading from the rear of the chassis to the front row seating area; and a pair of longitudinally extending support portions 34 flanking the aisle portion. In the embodiment shown in FIGS. 1-5, the floor 102 is an insulated structure that in use is overlain upon the existing floor of the cargo area of the van.

The plurality of panel members 22, 24, 26 has a use configuration [shown in FIG. 1-5] in the cargo area wherein it defines a room having:

a terminus 30 which separates the room from the front row seating area;

a substantially flat, horizontal, wipe clean ceiling having: a central portion 36 overlying the aisle portion; and a pair of strips 38 flanking the central portion, each strip overlying a respective one of the support portions 34;

for each support portion 34, a substantially flat, longitudinally-extending wipe clean flanking wall 40 extending substantially vertically from the edge of the floor to an elevation between 4 and 5 feet above the floor; and for each flanking wall 40, a substantially flat, longitudinally extending, wipe clean inclined wall 42 extending from a top edge of said each flanking wall to the edge of the ceiling defined by the strip overlying the support portion for which said flanking wall is provided.

It will be appreciated that when the frame members and panel members are deployed in the use configuration in the cargo area of a van, frame members 28 are sandwiched between the chassis (not shown) and the panel members 22, 24, 26. As clearly illustrated in at least FIGS. 4 and 1, the plurality of frame members 28 comprises, when in the use configuration in the cargo area, include a first set of spaced-apart vertical frame members 28, at least some of which extend upwards from the floor 102 to a respective first horizontal frame member 28 at the ceiling 26, the first set of spaced-apart vertical frame members 28 collectively supporting a first one of the flanking walls 40 and the inclined wall 42 that extends from the first one of the flanking walls 40, and a second set of spaced-apart vertical frame members 28, at least some of which extend upwards from the floor 102 to a respective second horizontal frame member 28 at the ceiling 26, the second set of spaced-apart vertical frame members 28 collectively supporting a second one of the flanking walls 40 and the inclined wall 42 that extends from the second one of the flanking walls. The plurality of frame members also include a plurality of spaced apart horizontally extending frame members 28 sandwiched between the ceiling 26 and a roof of the van chassis.

The system 100 also comprises a plurality of furnishing elements, each furnishing element having a use configuration wherein it does one of:

defines a substantially flat, longitudinally-extending base surface B extending substantially vertically from one of the support portions; and extends fully to the base surface from the flanking wall provided for said support portion;

defines a substantially flat, longitudinally-extending upper surface U extending substantially vertically from one of the strips; and extends fully to the upper surface from the inclined wall provided for the flanking wall that extends from the support surface overlain by the strip; and defines a substantially flat, longitudinally-extending combination surface C extending substantially vertically from one of the support portions to the strip overlying the support portion; extends fully to the combination surface from the flanking wall provided for said support portion; and extends fully to the combination surface from the inclined wall provided for the flanking wall that extends from the support surface overlain by the strip.

The plurality of furnishing elements includes base surface defining elements, namely, desks 104 and beds 106 upper surface defining elements, namely, over-desk cabinets 108 combination surface defining elements, namely, wall cabinets 110

Another example of the invention is a method for producing a van from a van chassis and a floor, the chassis having a front row seating area and also having a rear cargo area containing the floor in use, the floor including: a substantially flat, horizontal, longitudinally extending aisle portion 32 leading from the rear of the chassis to the terminus; and a pair of longitudinally extending support portions 34 flanking the aisle portion. In this embodiment, the floor is an insulated structure that is previously overlain upon the existing floor of the cargo area.

The method comprises the steps of:

securing the frame members to the van chassis;

securing the panel members to the frame members to define the room; and operatively mounting to the room at least one furnishing element.

FIGS. 6 through 22 show vans produced according to the method including various combinations of the aforedescribed furnishing elements as well as other structures such as blood chairs 112, infection stations 114, toilets 116, workstations 118 and partitions 120.

Whereas specific embodiments are shown, it will be apparent that variations are possible.

Further, vehicles other than those indicated above and under 10,000 lbs gvwr can be used.

Further, whereas in the example embodiment, a "wipe clean surface", namely, a smooth, non-porous, washable surface, tolerant to standard industrial cleaning products is provided, other surfaces could be included.

Accordingly, the invention should be understood to be limited only by the accompanying claims, purposively construed.

The invention claimed is:

1. A system for use with a floor and a van chassis having a rear cargo area and a front row seating area, the rear cargo area containing the floor, the floor including:

a longitudinally extending aisle portion leading from the rear of the chassis to the front row seating area; and a pair of longitudinally extending support portions flanking the aisle portion, the system comprising:

a plurality of panel members having a use configuration in the cargo area wherein they define a room having:

a terminus which separates the room from the front row seating area;

a substantially flat, horizontal, wipe clean ceiling having:

a central portion overlying the aisle portion; and a pair of strips flanking the central portion, each strips overlying a respective one of the support portions;

for each support portion, a substantially flat, longitudinally-extending wipe clean flanking wall extending substantially vertically from the edge of the floor to an elevation between 4 and 5 feet above the floor;

for each flanking wall, a substantially flat, longitudinally-extending, wipe clean inclined wall extending from said each flanking wall to the edge of the ceiling defined by the strip overlying the support portion for which said flanking wall is provided;

a plurality of frame members having a use configuration in the cargo area, exterior of the room, wherein the frame members are secured to the van chassis and sandwiched between the van chassis and the panel members, wherein the panel members are secured to the frame members and the frame members structurally support at least the flanking walls, inclined walls and ceiling; and at least one furnishing element having a use configuration wherein it does one of:

defines a substantially flat, longitudinally-extending base surface extending substantially vertically from one of the support portions; and extends fully to the base surface from the flanking wall provided for said support portion is provided;

defines a substantially flat, longitudinally-extending upper surface extending substantially vertically from one of the strips; and extends fully to the upper surface from the inclined wall provided for the flanking wall that extends from the support surface overlain by the strip; and defines a substantially flat, longitudinally-extending combination surface extending substantially vertically from one of the support portions to the strip overlying the support portion; extends fully to the combination surface from the flanking wall provided for said support portion; and extends fully to the combination surface from the inclined wall provided for the flanking wall that extends from the support surface overlain by the strip.

2. A system according to claim 1, wherein the room has a substantially flat, vertical, wipe clean partition defining the terminus.

3. A system according to claim 1, wherein the at least one furnishing element comprises a desk which defines the base surface.

4. A system according to claim 1, wherein the at least one furnishing element comprises a bed which defines the base surface.

5. A system according to claim 1, wherein the at least one furnishing element comprises an over-desk cabinet which defines the upper surface.

6. A system according to claim 1, wherein the at least one furnishing element comprises a wall cabinet which defines the combination surface.

7. A method for producing a mobile workstation from a floor and a van chassis having a rear cargo area and a front row seating area, the rear cargo area containing the floor, the floor including:

a longitudinally extending aisle portion leading from the rear of the chassis to the front row seating area; and a pair of longitudinally extending support portions flanking the aisle portion, the method comprising the steps of:

securing the frame members of claim 1 to the van chassis;

securing the panel members of claim 1 to the frame members to define the room; and operatively mounting to the room at least furnishing element according to claim 1.

8. The system according to claim 1 wherein the plurality of frame members comprises, when in the use configuration in the cargo area:

a first set of spaced-apart vertical frame members, at least some of which extend upwards from the floor to a respective first horizontal frame member at the ceiling, the first set of spaced-apart vertical frame members collectively supporting a first one of the flanking walls and the inclined wall that extends from the first one of the flanking walls, and a second set of spaced-apart vertical frame members, at least some of which extend upwards from the floor to a respective second horizontal frame member at the ceiling, the second set of spaced-apart vertical frame members collectively supporting a second one of the flanking walls and the inclined wall that extends from the second one of the flanking walls.

9. The system according to claim 2 wherein the plurality of frame members comprises, when in the use configuration in the cargo area, a plurality of spaced apart horizontally extending frame members sandwiched between the ceiling and a roof of the van chassis.

* * * * *